United States Patent
Kramer et al.

(10) Patent No.: US 12,441,615 B2
(45) Date of Patent: *Oct. 14, 2025

(54) METHOD OF ADMINISTERING NITRIC OXIDE GAS

(71) Applicant: ThermoLife International, LLC, Signal Hill, CA (US)

(72) Inventors: Ronald Kramer, Signal Hill, CA (US); Alexandros Nikolaidis, Nea Kallikratia (GR)

(73) Assignee: ThermoLife International, LLC, Signal Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,383

(22) Filed: Feb. 11, 2022

(65) Prior Publication Data
US 2022/0249796 A1    Aug. 11, 2022

Related U.S. Application Data

(63) Continuation of application No. PCT/US2022/016231, filed on Feb. 11, 2022.

(Continued)

(51) Int. Cl.
*A61K 33/00* (2006.01)
*A61K 9/00* (2006.01)
(Continued)

(52) U.S. Cl.
CPC .............. *C01B 21/24* (2013.01); *A61K 9/007* (2013.01); *A61K 33/00* (2013.01); *A61M 16/10* (2013.01);
(Continued)

(58) Field of Classification Search
None
See application file for complete search history.

(56) References Cited

U.S. PATENT DOCUMENTS

| | | |
|---|---|---|
| 1,916,983 A | 7/1933 | McKee |
| 2,176,144 A | 10/1939 | Meyer |
| | (Continued) | |

FOREIGN PATENT DOCUMENTS

| | | |
|---|---|---|
| CN | 1056225 | 11/1991 |
| CN | 1049824 | 3/2000 |
| | (Continued) | |

OTHER PUBLICATIONS

Arnold et al. (Biochemistry 1999;38(15):4750-4756) (Year: 1999).*
(Continued)

*Primary Examiner* — Ernst V Arnold
(74) *Attorney, Agent, or Firm* — Booth Udall, PLC; Pacer K. Udall

(57) ABSTRACT

The disclosure relates to methods of producing nitric oxide (NO) gas that is administrable without specialized equipment and does not provide nitrogen dioxide ($NO_2$) gas. The methods comprise combining a nitrate and/or nitrite anion and an elemental metal in an acidic solution in a vessel capable of housing liquid and gas constituents, wherein NO gas is produced by the reaction of the nitrate and/or nitrite anion and the elemental metal in the acidic solution. The method further comprises administering the NO gas produced to the subject via inhalation. Also described are compositions and kits for improved delivery of NO gas.

23 Claims, 4 Drawing Sheets

Related U.S. Application Data

(60) Provisional application No. 63/148,523, filed on Feb. 11, 2021, provisional application No. 63/180,039, filed on Apr. 26, 2021.

(51) Int. Cl.
  *A61K 33/06* (2006.01)
  *A61M 16/10* (2006.01)
  *A61M 16/12* (2006.01)
  *A61P 11/00* (2006.01)
  *A61P 11/08* (2006.01)
  *C01B 21/24* (2006.01)

(52) U.S. Cl.
  CPC .............. *A61M 16/12* (2013.01); *A61P 11/00* (2018.01); *A61P 11/08* (2018.01); *A61M 2202/0275* (2013.01)

(56) References Cited

U.S. PATENT DOCUMENTS

| | | |
|---|---|---|
| 2,553,533 A | 5/1951 | Komarik |
| 3,230,036 A | 1/1966 | Kappelmann |
| 3,552,978 A | 1/1971 | Inklaar |
| 3,886,040 A | 5/1975 | Chibata |
| 3,956,513 A | 5/1976 | Clarke |
| 3,997,659 A | 12/1976 | Knohl |
| 4,146,611 A | 3/1979 | Ondetti |
| 4,273,937 A | 6/1981 | Gum |
| 4,291,015 A | 9/1981 | Keith |
| 4,379,177 A | 4/1983 | McCoy |
| 4,687,782 A | 8/1987 | Brantman |
| 4,743,614 A | 5/1988 | Terano |
| 4,749,402 A | 6/1988 | Garrett |
| 4,871,550 A | 10/1989 | Millman |
| 4,976,960 A | 12/1990 | Grossman |
| 4,996,067 A | 2/1991 | Kobayashi |
| 5,026,071 A | 6/1991 | Miraglia, Jr. |
| 5,026,721 A | 6/1991 | Dudrick |
| 5,242,697 A | 9/1993 | Luca |
| 5,411,569 A | 5/1995 | Hjersted |
| 5,485,827 A | 1/1996 | Zapol |
| 5,500,436 A | 3/1996 | Schoenafinger |
| 5,543,430 A | 8/1996 | Kaesemeyer |
| 5,576,351 A | 11/1996 | Yoshimura |
| 5,631,031 A | 5/1997 | Meade |
| 5,679,704 A | 10/1997 | Schoenafinger |
| 5,767,160 A | 6/1998 | Kaesemeyer |
| 5,904,924 A | 5/1999 | Gaynor |
| 5,965,596 A | 10/1999 | Harris |
| 6,063,432 A | 5/2000 | Maxwell |
| 6,136,339 A | 10/2000 | Gardiner |
| 6,159,485 A | 12/2000 | Yu |
| 6,172,098 B1 | 1/2001 | Harris |
| 6,277,884 B1 | 8/2001 | De Tejada |
| 6,337,349 B1 | 1/2002 | Scafetta |
| 6,451,341 B1 | 9/2002 | Slaga |
| 6,562,869 B1 | 5/2003 | Hamilton |
| 6,608,109 B2 | 8/2003 | Allen |
| 6,784,209 B1 | 8/2004 | Gardiner |
| 7,040,313 B2 | 5/2006 | Fine |
| 7,235,237 B2 | 6/2007 | Loscalzo |
| 7,777,014 B2 | 8/2010 | Cattaruzza |
| 7,777,074 B2 | 8/2010 | Kramer |
| 7,799,782 B2 | 9/2010 | Munson |
| 8,034,836 B2 | 10/2011 | Kramer |
| 8,048,921 B2 | 11/2011 | Kramer |
| 8,178,572 B2 | 5/2012 | Kramer |
| 8,183,288 B2 | 5/2012 | Kramer |
| 8,303,995 B1 | 11/2012 | Bryan |
| 8,455,531 B2 | 6/2013 | Kramer |
| 8,466,187 B2 | 6/2013 | Kramer |
| 8,569,368 B2 | 10/2013 | Kramer |
| 8,569,369 B2 | 10/2013 | Kramer |
| 8,703,719 B1 | 4/2014 | Abraham |
| 8,852,660 B2 | 10/2014 | Miljkovic |
| 8,952,045 B1 | 2/2015 | Kramer |
| 8,952,046 B1 | 2/2015 | Kramer |
| 8,957,100 B1 | 2/2015 | Kramer |
| 8,957,101 B1 | 2/2015 | Kramer |
| 9,180,140 B2 | 11/2015 | Lundberg |
| RE46,372 E | 4/2017 | Miller |
| 10,555,921 B1 | 2/2020 | Kramer |
| 10,646,508 B1 | 5/2020 | Kramer |
| 10,736,916 B1 | 8/2020 | Kramer |
| 10,736,917 B1 | 8/2020 | Kramer |
| 11,154,499 B2 | 10/2021 | Nikolaidis |
| 11,260,096 B2 | 3/2022 | Kramer |
| 11,865,139 B2 * | 1/2024 | Kramer ................ A61K 31/375 |
| 2001/0002269 A1 | 5/2001 | Zhao |
| 2001/0011074 A1 | 8/2001 | Piccolo |
| 2001/0048952 A1 | 12/2001 | Siskind |
| 2001/0055617 A1 | 12/2001 | Mattern |
| 2001/0056069 A1 | 12/2001 | Klaus |
| 2002/0006532 A1 | 1/2002 | Robin |
| 2002/0022060 A1 | 2/2002 | Mathur |
| 2002/0065323 A1 | 5/2002 | Crooks |
| 2002/0119933 A1 | 8/2002 | Butler |
| 2002/0136802 A1 | 9/2002 | Mehansho |
| 2002/0147156 A1 | 10/2002 | Petit |
| 2003/0012744 A1 | 1/2003 | Pedersen |
| 2003/0014238 A1 | 1/2003 | Xun |
| 2003/0062043 A1 * | 4/2003 | Fine ...................... A61K 33/00 128/203.12 |
| 2003/0091615 A1 | 5/2003 | Craig |
| 2003/0097401 A1 | 5/2003 | Bauman |
| 2003/0119888 A1 | 6/2003 | Allen |
| 2003/0139354 A1 | 7/2003 | Buccholz |
| 2004/0006140 A1 | 1/2004 | Kaesemeyer |
| 2004/0048870 A1 | 3/2004 | Amir |
| 2004/0057926 A1 | 3/2004 | Ochoa |
| 2004/0058011 A1 | 3/2004 | Petersson |
| 2004/0087518 A1 | 5/2004 | Verlaan |
| 2004/0097401 A1 | 5/2004 | Datta |
| 2004/0126366 A1 | 7/2004 | Kaddurah-Daouk |
| 2004/0224868 A1 | 11/2004 | Meyerhoff |
| 2004/0242682 A1 | 12/2004 | Kaesemeyer |
| 2005/0043274 A1 | 2/2005 | Murad |
| 2005/0053673 A1 | 3/2005 | Netke |
| 2005/0171194 A1 | 8/2005 | Yu |
| 2005/0196474 A1 | 9/2005 | Anno |
| 2005/0256192 A1 | 11/2005 | Gardiner |
| 2005/0261257 A1 | 11/2005 | Vermeer |
| 2005/0287210 A1 | 12/2005 | Ron |
| 2005/0288372 A1 | 12/2005 | Ron |
| 2005/0288373 A1 | 12/2005 | Ron |
| 2006/0014238 A1 | 1/2006 | Gholap |
| 2006/0018281 A1 | 1/2006 | Sadot |
| 2006/0029668 A1 | 2/2006 | Ron |
| 2006/0035007 A1 | 2/2006 | Kawabe |
| 2006/0063827 A1 | 3/2006 | Yu |
| 2006/0116328 A1 | 6/2006 | Babizhayev |
| 2006/0134227 A1 | 6/2006 | Bortz |
| 2006/0142382 A1 | 6/2006 | Morimoto |
| 2006/0182815 A1 | 8/2006 | Gladwin |
| 2006/0198899 A1 | 9/2006 | Gardiner |
| 2006/0241181 A1 | 10/2006 | Pola |
| 2006/0275909 A1 | 12/2006 | Spitzer |
| 2007/0037880 A1 | 2/2007 | Mailland |
| 2007/0105817 A1 | 5/2007 | Page |
| 2007/0141174 A1 | 6/2007 | Cornett |
| 2007/0154569 A1 | 7/2007 | Gladwin |
| 2007/0166355 A1 | 7/2007 | Brakstad |
| 2008/0004218 A1 | 1/2008 | Quay |
| 2008/0026075 A1 | 1/2008 | Kondo |
| 2008/0038410 A1 | 2/2008 | Giordano |
| 2008/0138448 A1 | 6/2008 | Heuer |
| 2008/0163793 A1 | 7/2008 | Gernon |
| 2008/0214649 A1 | 9/2008 | Yu |
| 2008/0233186 A1 | 9/2008 | Romero |
| 2008/0233242 A1 | 9/2008 | Zhang |
| 2008/0268095 A1 | 10/2008 | Herzog |
| 2009/0076110 A1 | 3/2009 | Kramer |
| 2009/0137670 A1 | 5/2009 | Kramer |

(56) References Cited

U.S. PATENT DOCUMENTS

| | | |
|---|---|---|
| 2009/0280199 A1 | 11/2009 | Russell |
| 2009/0306208 A1 | 12/2009 | Shimada |
| 2010/0004335 A1 | 1/2010 | Kagami |
| 2010/0047344 A1 | 2/2010 | Lundberg |
| 2010/0092441 A1 | 4/2010 | Lundberg |
| 2010/0172890 A1 | 7/2010 | Gilad |
| 2011/0064712 A1 | 3/2011 | Amato |
| 2011/0123654 A1 | 5/2011 | Jaeger |
| 2012/0220643 A1 | 8/2012 | Kramer |
| 2013/0071494 A1 | 3/2013 | Bryan |
| 2013/0101704 A1 | 4/2013 | Meehan |
| 2015/0246066 A1 | 9/2015 | Nelson |
| 2017/0042935 A1 | 2/2017 | Sakamoto |
| 2017/0303582 A1 | 10/2017 | Lu |
| 2017/0306440 A1 | 10/2017 | Hein |
| 2018/0133247 A1 | 5/2018 | Green |
| 2020/0222449 A1 | 7/2020 | Nikolaidis |
| 2020/0405662 A1 | 12/2020 | Kramer |
| 2021/0220422 A1 | 7/2021 | Parker |
| 2021/0355191 A1 | 11/2021 | Sherman |
| 2022/0143080 A1 | 5/2022 | Kramer |

FOREIGN PATENT DOCUMENTS

| | | | |
|---|---|---|---|
| CN | 1631539 | 6/2005 | |
| CN | 20041009958 | 6/2005 | |
| CN | 109480107 | 3/2019 | |
| CN | 110680809 | 1/2020 | |
| CR | 20140504 A2 | 3/2015 | |
| EP | 0031284 | 7/1981 | |
| EP | 797992 A2 | 1/1997 | |
| EP | 1336602 | 8/2003 | |
| EP | 1429829 B1 * | 11/2013 | ............ A61K 33/00 |
| EP | 2896302 | 7/2015 | |
| GB | 1089084 A | 11/1967 | |
| GB | 2008578 A | 6/1979 | |
| GB | 2052976 A | 2/1981 | |
| GB | 2354441 | 3/2001 | |
| JP | 2010519335 | 6/2010 | |
| JP | 2012529909 | 11/2012 | |
| JP | 2014513527 | 6/2014 | |
| JP | 2014122162 | 7/2014 | |
| KR | 20110015141 A | 2/2011 | |
| WO | 9843499 | 10/1998 | |
| WO | 0040217 | 7/2000 | |
| WO | 0117525 | 3/2001 | |
| WO | 0195897 | 12/2001 | |
| WO | 03063789 A2 | 8/2003 | |
| WO | 2005062713 | 7/2005 | |
| WO | 2005115175 | 12/2005 | |
| WO | 2005115175 A1 | 12/2005 | |
| WO | 2006025286 | 3/2006 | |
| WO | 2006124161 | 11/2006 | |
| WO | 2007000985 | 1/2007 | |
| WO | 2007066642 | 6/2007 | |
| WO | 2007093808 | 8/2007 | |
| WO | 2008009615 A1 | 1/2008 | |
| WO | 2008043855 | 4/2008 | |
| WO | 2008105730 | 9/2008 | |
| WO | 2008105731 | 9/2008 | |
| WO | 2018019663 | 2/2018 | |
| WO | 2020160509 A1 | 8/2020 | |
| WO | 2020214841 A1 | 10/2020 | |
| WO | 2021188163 | 9/2021 | |
| WO | 2022104157 | 5/2022 | |
| WO | 2022192743 A1 | 9/2022 | |

OTHER PUBLICATIONS

Sulcius, A. (J. Chem. Educ. 2015;92:1971-1972). (Year: 2015).*
Que, R. (J. Chem. Educ. 2022, 99, 2762-2765). (Year: 2022).*
Glyceryl trinitrate—leaflet print—Patient UK, available at http://www.patient.co.uk/printer.asp?dock=30003883, 2009.
Heart attack—Nitrates & vasodilators—Revolution Health, available at http://www.revolutionhealth.com/conditions/ heart/herat-attack/medication-types/nitrates-vasodilators/ 2011.
"Isosorbide dinitrate—leaflet print—Patient UK," available at http://www.patient.co.uk/printer.asp?doc= 30003884, 2011.
"Isosorbide mononitrate-leaflet print—Patient UK," available at http://www.patient.co.uk/printer.asp?doc=30003885, 2008.
"Dietary Nitrate and Nitrite to Increase Nitric Oxide in Patients with Coronary Artery Disease," Clinical Trial available at http://clinicaltrials.gov/ct2/show/NCT00069654, 2010.
"Dymatize Nutritional Supplements, Whey Protein, Bodybuilding & Weight Products", 2013 Dymatize Enterprises LLC, Xpand 2x 36 Serving, http://www.dymatize.com/products/nitric-oxide/detail/1166/xpand-2x-36-serving, 2013.
"Heart attack—Nitrates & vasodilators—Revolution health," available at http://www.revolutionhealth.com/conditions/heart/heart-attack/medication-types/nitrates-vasodilators, 2011.
"Nitrates and nitrites (PIM G016)," available at http://www.inchem.org/documents/pims/chemical/pimg016.htm, 2011.
"Nitrates and Nitrites", TEACH Chemical Summary, U.S. EPA, Toxicity and Exposure Assessment for Children's Health, published by the U.S. Environmental Protection Agency on May 22, 2007 (Year: 2007).
"Xpand 2x by Dymatize at Bodybuilding.com—Lowest Price on Xpand 2x!", Advertisement, 2012 BodyBuilding.com, LLC., http://www.bodybuilding.com/store/dymatize/xpand-2x.html, Jun. 8, 2013.
21 C.F.R. (I)(B) §§ 172.160 and 172.170, revised Apr. 1, 2018 (Year: 2018).
A Butler, et al., Medieval Chinese Medicine: The Dunhuang Medical Manuscripts (Chapter 16: A treatment for carenovascular dysfunction in a Dunhuang medical manuscript), Routledge (2005).
Abd El-Gawad et al. AAPS PharmaSciTech, 2017, 18(5):1795-1809.
Abou-Mohamed et al. "Role of L-Arginine in the Vascular Actions and Development of Tolerance to Nitroglycerin", British Journal of Pharmacology (2000) 130, 211-218.
Ahtee et al."Taurine Biological Actions and Clinical Perspectives," J. Nutr. 116:2555-2556 (1986).
Amidon, G. L. et al., "Intestinal Absoption of Amino Acid Derivatives: Structural Requirements for Membrane Hydrolysis.", Journal of Pharmaceutical Sciences., (1983), vol. 72, No. 8, pp. 943-944, XP055127041.
Amino Thrust dietary supplement, 2007.
Anders et al. "Aminoacylases", 1994, Advances in Pharmacology, vol. 27, pp. 431-448. (Year: 1994).
Anderson, K. "Nitrate and Nitrite in Human Nutrition" The Graduate College in the University of Nebraska, Lincoln, Nebraska, 1982.
Aniya et al., "Evaluation of Nitric Oxide Formation from Nitrates in Pig Coronary Arteries," Jpn. J. Pharmacol. 71:101-107 (1996).
Archer, Evidence that ingested nitrate and nitrite are beneficial to health, Journal of food protection, vol. 65, No. 5, pp. 872-875, 2002.
Arenas et al., Muscle & Nerve, 1991, 14:598-604.
Arnold Iron CRE3, 2007.
Artioli et al. "Role of beta-Alanine Supplementation on Muscle Carnosine and Exercise Performance" Med. Sci. Sprots Exerc, Jun. 2010, vol. 42, No. 6pp. 1162-1173.
Atanasova, Plant Siol Environ, 2008, 54(2):66-71.
Avraham et al., "Tyrosine improves appetite cognition and exercise tolerance in activity anorexia," Medicine & Science in Sports & Exercise, 33(12):2104-2110, 2001.
B. C. Challis, Nutrition and nitrosamine formation, Proceeds of the Nutrition Society, vol. 44, pp. 95-100 (1985).
B. Spiegelhalder, et al., Influence of Dietary Nitrate On Nitrate Content of Human Saliva: Possible Relevance of N-Nitroso Compounds, Fd. Cosmet. Toxicol., vol. 14, pp. 545-548 (1976).
B. Sridhar, et al, "Bis (beta-alanine) Hydrogen Nitrate", Acta Crystallographica Section, 2001, pp. 1004-1006vol. 57.
Bahadur et al., "Crystal and molecular stucture of DL-aspartic acid nitrate monohydrate," Z. Kristallogr. 210: 276-278, 1995.
Bailey et al. "Dietary nitrate supplementation reduces the O2 cost of low-intensity exercise and enhances tolerance to high-intensity exercise in humans", J. Appl. Physiol., 2009, vol. 107, pp. 1144-1155. (Year: 2009).

(56) References Cited

OTHER PUBLICATIONS

Baran, "Crystal structure, phase transitions and vibrational spectra of bis(betaine) nitrate," Journal of Molecular Structure, 372: 131-144, 1995.
Barger, G. (1914) The Simpler Natural Bases. In R.H.A. Plimmer & F.G. Hopkins (Eds.) Monographs on Biochemistry (pp. 157-163) Longmans, Green & Co., London.
Barron JT and Parillo JE, "Production of lactic acid and energy metabolism in vascular smooth muscle: effect of dichloroacetate." Am J Physiol. Feb. 1995;268(2 Pt 2):H713-9.
Basheva et al."Role of Betaine as Foam Booster in the Presence of Silicone Oil Drops," Langmuir 16:1000-1013 (2000).
Bauer et al., "Vascular and Hemodynamic Differences between Organic Nitrates and Nitrites," Journal of Pharmacology and Experimental Therapeutics 280:326-331 (1997).
Bauer et al."Photochemical Generation of Nitric Oxide from Nitro-containing Compounds: Possible Relation to Vascular Photorelaxation Phenomena," Life Science 54(1):PL1-PL4 (1994).
BeetVO2Max—max Nitric Oxide Booster, Amazon.com, 2006.
Beghetti et al."Nitric oxide precursors and congenital cardiac surgery: A randomized controlled trial of oral citrulline. Definition of pulmonary hypertension in Fontan circulation?" J Thorac Cardioasc Surg 132(6):1501-1502 (2006).
Bendahan et al., "Citrulline/malate promotes aerobic energy production in human exercising muscle," Br. J. Sports Med., 36: 282-289, 2002.
Benjamin, Nigel, Nitrates in the Human Diet—good or bad?, Ann. Zootech. vol. 49, pp. 207-216 (2000).
Berge et al., Journal of Pharmaceutical Science, 66(1):1-19, 1977.
Betancourt product: Betancourt Ripped Juice EX2, 2006.
Beverly International advertisement in Dec. 1987 edition of Muscle & Fitness.
Blodgett et al. "Incidence of Hematologic Disease in Patients with Carpal Tunnel Syndrome" JAMA, 1962, 182(7), pp. 814-815.
Bloomer et al., "Comparison of pre-workout nitric oxide stimulating dietary supplements on skeletal muscle oxygen saturation, blood nitrate/nitrite, lipid peroxidation, and upper body exercise performance in resistance trained men", Journal of the International Society of Sports Nutrition 2010, 7:16, http://www.jissn.com/content/7/1/16.
Bloomer et al."Glycine propionyl-L-carnitine increases plasma nitrate/nitrite in resistance trained men," Journal of the International Society of Sports Nutrition 4(22):1-6 (2007).
Boger, "The Pharmacodynamics of L-Arginine," J. Nutr. 137: 1650S-1655S (2007).
Boguslavskiy. Effect of nitric oxide on the efficiency of oxygen usage by a working skeletal muscle under fatigue, Fiziol. Zhum., vol. 51, No. 1, pp. 33-42 (2005) & Certified Translation.
Borison et al., "Brain 2-phenylethylamine as a major mediator for the central actions of amphetamine and methylphenidate," Life Sci., 17: 1331-1344, Nov. 1975.
Bover-Cid et al., "Biogeneic Amine Accumulation in Ripened Sausages Affected by the Addition of Sodium Sulphite", Meat Science 59 (2001) 391-396, Mar. 20, 2001.
Bryan, N., "Food, Nutrition and the Nitric Oxide Pathway: Biochemistry and Bioactivity" 2010, pp. 59-63.
BSN Volumaize Aretic Blast, on line, sale product, 2014.
Burtscher. The Proonged Intake of L-Arginine-L-Aspartate Reduces Blood Lactate Accumulation and Oxygen Consumption During Submaximal Exercise, Journal of Sports Science and Medicine, vol. 4, pp. 314-322 (2005).
C. Oldreive, et al., The Mechanisms for Nitration and Nitrotyrosine Formation in vitro and in vivo: Impact of D;et, Free Rad. Res., vol. 35, pp. 215-231 (2001).
CAS Registry No. 89695-59-0 (1984).
Cavassa et al. WO98/43499, 1998.
CFIndustries, "Material Safety Data Sheet for Urea Ammonium Nitrate Solution (UAN)," available at www.cfindustries.com/pdf/UANMSDS.pdf Oct. 25, 2006.
Chabot et al., "Characterization of the vasodilator properties of peroxynitrite on rat pulmonary artery: role of poly (adenosine 5'-diphosphoribose synthase," British Journal of Pharmacology 121:485-490 (1997).
Chang et al., "Arginase modulates nitrix oxide production in activated macrophages," Am. J. Physiol., 274: H342-348, 1998.
Chemical Abstracts Service, "Chemical Abstracts", The American Chemical Society, Liquid Crystals, vol. 104, Jun. 2, 1986.
ColorMaker, 2006.
CPG Sec 565.100 FDA Jurisdiction Over Meat and Poultry Products, 2005.
Craig, "Betaine in human nutrition," Am J Clin Nutr, 80:539-549,2004.
Creatine from Wikipedia, 2017.
Creatine nitrate from PubChem, 2017.
Cromwell et al., "The Biosynthesis and Metabolism of Betaines in Plants," 1953 Biochem J., 55: 189-192.
Crooks et al., U. S. Patent Application Publication No. 2002/0065323 A1, published May 30, 2002.
Curtis, J., Dec. 6, 2017, "Nitrate-Free Bacon: Myth or Reality", https://firsthandfoods.com/author/jennifer/, pp. 1-2 (Year: 2017).
D. D. Rees, et al., Role of endothelium-derived nitric oxide in the regulation of blood pressure, Proc. Natl. Acad. Sci. USA, vol. 86, pp. 3375-3378 (May 1989).
Danov et al., "Mixed Solutions of Anionic and Zwitterionic Surfactant (Betaine): Surface Tension Isotherms, Adsoprtion, and Relaxation Kinetics," 2004 Langmuir 20: 5445-5453.
Declaration of James L. Bono Under 37 C.F.R. § 1.132 dated Aug. 27, 2014.
Declaration of Richard Chamberlin Dessaignes, Comptes Rendus 1854 Under 37 C.F.R. § 1.132 dated Aug. 15, 2014 filed in Reexam. U.S. Appl. No. 90/011,869 and U.S. Appl. No. 90/011,869.
Declaration of Richard Chamberlin Under 37 C.F.R. § 1.132 dated Aug. 28, 2014.
Del Compo et al., "Creatinine, creatine and protein in cooked meat products", Food Chemistry, vol. 63, No. 2, pp. 187Y190, 1998.
Del Pilar Garcia-Santos et al., "Reactivity of Amino Acids in Nitrosation Reactions and Its Relation to the Alkylating Potential of Their Products," J. Am. Chem. Soc., 2002, 124(10): 2177-2182.
Dessaignes et al., The Chemist or Chemical & Physical Science, 1854, pp. 594-597.
Dhar et al., Complex Compounds of Acid, Base and Salt with Nitrogenous and Other Organic Substances, in National Academy of Sciences, India, Symposium on Nitrogen, Part 1, Section A, vol. 31, 1961, pp. 76-79.
Dhas, S.A. Martin Britto et al., Growth and Characterization of a New Organic NLO Material; Glycine Nitrate, ScienceDirect, Optics communications 278 (2007) 434-438.
Di Pasquale MG. Amino Acid and Proteins for the Athelete: The Anabolic Edge. CRC Press LLC, 1997, pp. 99-145.
Duncan et al., "Chemical generation of nitric oxide in the mouth from the enterosaliary circulation of dietary nitrate," Nature Medicine, 1 (6): 546-551, Jun. 1995.
Dymatize Nutrition, "Pre-Workout", http://www.dymatize.com/nitric-oxide, Mar. 31, 2014—Advertisement.
Dymatize Nutrition, "Xpand 2x 10 Serving—Dymatize Nutritional Supplements, Whey Protein, Bodybuilding", http://www.dymatize.com/store/p/289-Xpand-2x-10-Servings.html—Advertisement. 2014.
Dymatize® Xpand 2x®, Fruit Punch, Dymatize—GNC, www.gnc.com/product/index.jsp?productId=13180805, Jun. 17, 2013, p. 1-2.
EAS advertisement for "Phosphagen Elite" Joe Welder's Muscle & Fitness, Sep. 2005.
Eaton et al., "Urinary Beta-Alanine Excretion is a Marker of Abnormal as well as Normal Gut Fermentation", Journal of Nutritional & Environmental Medicine (Jun. 2004) 14(2), 121-127.
Edwards et al., "Amino Acids in Foods, Cystine, Tyrosine, and Essential Amino Acid Contents of Selected Foods", Agricultural and Food Chemistry, vol. 3, No. 11 , Nov. 1955.
Elkayam et al. "Prevention of nitrate tolerance with concomitant administration of hydralazine" Can J CArdiol, 1996, vol. 12, suppl C, pp. 17C-21C. (Year: 1996).
Elmore et al., "Compilation of free amino acid data for various food raw materials, showing the relative contributions of asparagine,

(56) References Cited

OTHER PUBLICATIONS glutamine, aspartic acid and glutamic acid to the fee amino acid composition", Oct. 2002, JIFSAN Acrylamide in Food Workshop, Chicago. (Year 2002).
English translation of KR-20110015141-A, Feb. 15, 2011, pp. 1-23 (Year: 2011).
Eppendorfer et al., "Free and Total Amino Acid Composition for Edible Pears, Beans, Kale, Spinach, Cauliflower, and Potatoes as Influenced by Nitrogen Fertilisation and Phosphorus Deficiency," J.Sci. Food Agric. 71 449-458, 1996.
Eto et al. publication, Archives of Physiology and Biochemistry, 1995, 103(2):160-4.
Examine.com, "L-Carnitine", Sep. 12, 2014, https://examine.com/supplements/l-carnitine/. (Year:2014).
F. Murad, Cyclic Guanosine Monophosphate as a Mediator of Vasodilation, J. Clin. Invest., vol. 78, pp. 1-5 (Jul. 1986).
Fanous, S. "Is Sodium Nitrate Bad for You?", May 20, 2015, Healthline, https://www.healthline.com/health/food-nutrition/is-sodium-nitrate-bad-for-you#1, pp. 1-8. (Year: 2015).
Fayers et al."Nitrate tolerance and the links with endothelial dysfunction and oxidative stress," Br J Clin Pharmacol 56:620-628 (2003).
FDA Regulation 42 FR, 1977.
FDA Regulation 48 FR 1701, Indirect Food Additives; Paper and Paperboard Components, FDA, 1983.
Feelisch et al., Eur J. Pharmacol., 1987, 139(1):19-30.
Fetih et al. "Excellent Absorption Enhancing Characteristics of NO Donors for Improving the Intestinal Absorption of Poorly Absorbable Compound Compared with Conventional Absorption Enhancers," Drug Metab. Pharmacokinet. vol. 21(3):222-229 (2006).
Fetih et al. "Nitric oxide donors can enhance the intestinal transport and absorption of insulin and [Asu1,7]-eel calcitonin in rats," Journal of Controlled Release 106:287-297 (2005).
Flaherty, 1989, Drugs, 137:523-550.
Fraser et al. publication, circulation, 1983, 67(2): 405-412.
G. M. McKnight, et al., Chemical synthesis of nitric oxide in the stomachfi-om dietary nitrate in humans, Gut, vol. 40, pp. 211-214 (1997).
G. M. McKnight, et al., Dietary nitrate in man: friend or foe?, British Journal of Nutrition, vol. 81, pp. 349-358 (1999).
G. R. J. Thatcher, Serial Review: Mechanisms and Novel Directions in the Biological Applications of Nitric Oxide Donors, Free Radical Biology & Medicine, vol. 37, No. 8, pp. 1122-1143 (2004).
G. Richardson, et al., The ingestion of inorganic nitrate increases gast,-;c S-nitrosothio/ levels and inhibits platelet unction in humans, Nitric Oxide, vol. 7, pp. 24-29 (2002).
G.S. Stokes, et al., Long-Term Effectiveness of Extended-Release Nitrate for the treatment of Systolic Hypertension, Hypertension vol. 45, pp. 380-384 (2005).
Gao et al., "Agmatine: A Novel Endogenous Vasodilator Substance," Life Sciences, 57(8): 83-86, 1995.
Gao et al., Life Science, 1995, 57: 83-86.
Giant Sport Metabolic Bioshock—Workout Supplement, on line, sale product, 2014.
Gibson et al. "Protective role of the epithelium of the small intestine and colon", inflamm. Bowel Dis., 1996, vol. 2, No. 4, pp. 279-302, abstract provided. (Year: 1996).
GNC Mega Men, "GNC Mega Men 90 Caplets", http://www.gnc.com/GNC-Mega-Men-reg/product.jsp?productid=4033432, Apr. 22, 2014.
Godzisz, "Classification and nature of hydrogen bonds to betaine. X-ray, 13C CP MAS and IR description of low barrier hydrogen bonds," Journal of Molecular Structure, 606:123-137,2002.
Grasemann et al., "Oral L-arginine supplementation in cystic fibrosis patients: a placebo-controlled study," Eur Respir J 25:62-68 (2005).
Green et al. publication, Sports Med., 1996, 21(2): 119-146.
Gwartney, D. L, "On the Horizon: Agmatine," Oct./Nov. 1998, PUMP 101:96-97.

Harm J. Knot. "Nitrate Tolerance in Hypertension New Insight Into a Century-Old Problem," Circulation Research vol. 93:799-801 (2003).
Harris et al. "The absorption of orally supplied beta-alanine and its effect on muscle carnosine synthesis in human vastus lateralis" Amino Acids, 2006, vol. 30, pp. 270-289. (Year: 2006).
Harrison, D.G. et al., "The Nitrovasodilators, new Ideas About Old Drugs," Circulation, vol. 87, No. 5, May 1993, pp. 1461-1467).
Hatanaka et al."Stereoselective Pharmacokinetics and Pharmacodynamics of Organic Nitrates in Rats," J Pharmacol Exp Ther. vol. 298(1):346-53 (2001).
Haussuhl, "Elastic and thermoelastic properties of twelve adducts of betaine," Z Kristallogr, 188:311-320,1989.
Hayashi et al.PNAS 102(38):13681-13686 (2005).
Henriksson et al., Acta Physiol, Sep. 1, 2007, 191:1.
Herbwisdom.com, 2006.
Hoffman et al., "Effect of Creatine and β-Alanine Supplementation on Performance and Endocrine Responses in Strength/Power Athletes", International Journal of Sport Nutrition and Exercise Metabolism, 2006, 16, 430-446, © 2006 Human Kinetics, Inc.—20.
Honikel's publication, Meat Science, 2008,78: 68-76.
Hord et al., "Food sources of nitrates and nitrites: the physiologic context for potential health benefits1-3", Perspective, Am J Clin Nutr 2009;90:1-10, American Society for Nutrition.
Hui or Shi et al., Handbook of Food Science, Technology, and Engineering, 2006, vol. 4, Chapter 170, p. 170-1-170-9.
Hunter et al., "The Inhibition of Arginase By Amino Acids", Department of Pathological Chemistry, University of Toronto, Canada, Jul. 24, 1944.
Huxtable et al. Physiological Reviews, 72(1):101-142, 1992.
IForce Nutrition product "Potassium Nitrate", 2006.
Ignarro ("After 130 years, the molecular mechanism of action of nitroglycerin is revealed,"[online], Jun. 11, 2002 [retrieved on May 8, 2016] Retrieved from the Internet: <http://www.pnas.org/cgi/content/full/99/12/7816?ck=nck>).
Ignarro et al. publication, The Journal of Pharmacology and Experimental Therapeutics, 1988, 244(1): 181-189.
Ignarro et al., "Pharmacology of Endothelium-derived Nitric Oxide and Nitrovasodilators", The Western Journal of Medicine, Jan. 1991, 154.
Ilczyszyn et al. CAS: 145:83630 2006.
Ingested Nitrate and Nitrite, and Cyanobacterial Peptide Toxins, World Health Organization International Agency for Research on Cancer (2010).
Ionic Liquids ( URL: https://www.organic-chemistry.org/topics/ionic-liquids.shtm ), printed Apr. 2019 (Year: 2019). cited by examiner .
Ishii et al., "High glucose augments arginase activity and nitric oxide production in the renal cortex," Metabolism 53(7):868-874 (2004).
J. Abrams, MD, Beneficial Actions of Nitrates in Cardiovascular Disease, The American Journal of Cardiology, vol. 77, pp. 31C-37C (May 30, 1996).
Jablecka et al.Med Sci Monit 10(I):CR29-32 (2004).
Jamalian et al., "Nutritional Value of Middle Eastern Foodstuffs", Jamalian & Pellett : Nutritional Value of Middle Eastern Foodstuff's. IV, Dec. 1967.
Joy et al., "A multi-ingredient, preworkout supplement is apparently safe in healthy males and females," Food & Research, 59:27470, 2015.
K. Cosby, et al., Nitrite reduction to nitric oxide by deoxyhemoglobin vasodilates the human circulation, Nature Medicine, vol. 9, No. 12, pp. 1498-1505(Dec. 2003).
K. Tsuchiya, et al., Malfunction of Vascular Control in Lifestyle-Related Diseases: Formation of Systemic Hemoglobin-Nitric Oxide Complex (HbNO) From Dietary Nitrite, J. Pharmacol Sci, vol. 96, pp. 395-400 (2004).
Kemmerer et al. publication, J. Nutr., 1949, 38(4): 527-33.
Kendrick et al., "The effect of 4 weeks B-alanine supplementation and isokinetic training on carnosine concentrations in type I and II human skeletal muscle fibres", Eur J Appl Physiol (2009) 106:131-138, Feb. 12, 2009.
Kenechuwu et al. J. Microencapsul, 2017, 34(6):592-609.

(56) References Cited

OTHER PUBLICATIONS

Kernohan et al., "An oral yohimbine/L-arginine combination (NMI 861) for the treatment of male erectile dysfunction: a pharmacokinetic, pharmacodynamic and interaction study with intravenous nitroglycerine in healthy male subjects", British Journal of Clinical Pharmacology, © 2004 Blackwell Publishing Ltd.
Kou et al. applicaiton No. 200410009958.3, 2005.
Kramer et al., U. S. Patent Application Publication No. 2009/076110 A1 published Mar. 19, 2009.
L. Appel, et al., A Clinical Trial of the Effects of Dietal J1 Patterns on Blood Pressure, N. Engl. J. Med., 336:16, pp. 1117-1124 (Apr. 17, 1997).
L. Brunton, An Address on Blood Pressure In Man: Its estimation and indications for treatment, The British Medical Journal, pp. 64-67 (Jul. 10, 1909).
L. Brunton, et al., An Address on Longevity and the Means of Attaining It, The Lancet, vol. 168, Issue 4342, pp. 1330-1335 (Nov. 17, 1906).
L. Noah et al, Starting from Scratch?: Reinventing the Food Additive Approval process, Boston Univ. L. Rev. vol. 78:329, pp. 329-443 1998.
L. Stryer, Biochemistry, Third Edition, W. H. Freeman and Company, pp. 15-24, 261-268, 499-502, and 933-936, New York, 1988.
Large Wendy, "Circuit training combines aerobic and anaerobic workouts into one," News Journal (Mansfield Ohio), Sep. 5, 2004.
Larsen et al. publication, New England Journal of Medicine, 2006, 2792-2793.
Larsen, Effects of dietary nitrates on oxygen cost during Exercise, B. Acta Physiol 191(1 ):59-66 (2007).
Lewis et al. publication, Pharmacol. Biochem Behav, 2007, 88(1): 114-21.
Ilczyszyn et al. 13C chemical shift tensors of hydrogen bonded amino acids: Relations between experimental and calculated results. Chemical Physics 323 (2006) 231-242.
Luigi et al., Med. Sc.i Sports Exerc., 1999, 31(12): 1748-54.
Lundberg et al., "Cardioprotective effects of vegetables: Is nitrate the answer?", Science Direct, Jan. 2006.
Lundberg et al., "The nitrate-nitrite-nitric oxide pathway in physiology and therapeutics", 2008 Nature Publishing Group, Feb. 2008, vol. 7.
Lundberg et al., Arterioscler. Thromb. Vasc. Biol., 25:915-922 (2005).
Lundberg et al., Inorganic nitrate is a possible source of systemic generation of nitric oxide, Free Radical Biology Medicine, vol. 37, No. 3. pp. 395-400, 2004.
Luscher, "Endogenous and exogenous nitrates and their role in myocardial ischaemia," Br. J. Clin. Pharmacol. 34:29S-35S (1992).
Magg, G.W., Hecker, R.J. and Whitaker, P.A., "Nitrogenous Compounds in Sugarbeet Juices", Journal of the American Society of Sugar Beet Technologists, 1972; vol. 17, No. 2pp. 154-164.
Marconi, Int. J. Sports Med, 11 (1990):1-14.
Maynard et al., "High Levels of Dietary Carnosine Are Associated with Increased Concentrations of Carnosine and Histidine in Rat Soleus Muscle," J. Nut. 131:287-290 (2001).
Merriam-Webster definition of supplement https://www.merriam-webster.com/dictionary/supplementlaccessed Jun. 20, 2019] (Year: 2019).
Miller, Elements of Chemistry—Theoretical and Practical, Longsmans, Green, Reader and Dyer, 1969, pp. 757-770.
Ming et al.Circulation 110:3708-3714 (2004).
Mostad et al."Crystal and molecular structure of DL-methionine nitrate," CAS 104:1975, 43 (1986).
Mostad, A., Zeitschrift fur Kristallographie, 172: 175-182, 1985.
MrSupplement.com product dietary supplement Creatine Nitrate, 2006.
Muramoto, J., "Comparison of Nitrate Content in Leafy Vegetables from Organic and Conventional Farms in California" Center for Agroecology and Sustainable Food Systems University of California, Santa Cruz, 1999.
Nature's Best advertisement for "Perfect L-Glutamine" Joe Weider's Muscle & Fitness, Sep. 2005.
Niu et al."Vasorelaxant effect of taurine is diminished by tetraethylammonium in rat isolated arteries," European Journal of Pharmacology 580:169-174 (2008).
NutrabioBCAA2500, 2006.
Oka et al.Vasc Med 10:265-274 (2005).
Optimum Nutrition advertisement for "Adenergy Stack" Joe Weider's Muscle & Fitness, Sep. 2005.
Pariser et al. Cutis, 1994, 54(1): 43-44.
Parker et al., The Effect of Supplemental L-Arginine on Tolerance Development During Continuous Transdermal Nitroglycerin Therapy, J. of Am. Coll. of Cardiology, 39(7): 1199-1203, 2002.
PEScience High Volume, 2007.
Petersson et al., "Dietary nitrate increases gastric mucosal blood flow and mucosal defense," Am. J. Physiol. Gastrointest. Liver, 292: G718-G724, 2007.
Petrosyan et al., J. Molecular Structure, 794: 160-167, 2006.
Pickering et al., Why Don't We Use Nitrates to Treat Older Hypertensive Patients?, Journal of Clinical Hypertension, vol. 7, No. 11, pp. 685-690 (Nov. 2005).
Pischel et al. CAS: 134:71896, 2001.
Pradhan et al., Journal of Chemical and Engineering Data, 2000, 45(1):140-143.
ProArgi 9 Supplement Website: ProArgi-9 Plus FAQ, "ProArgi 9 Plus Site", http://proargi9site.blogspot.com/p/proargi-9-plus-faq.html, Apr. 22, 2014.
PS Nutrition Creatine Nitrate, on line, sale producr, 2014.
QuadraLean by RSP Nutrition, Bodybuilding.com, 2006.
R.C. Harris et al., "The Influence of Beta-Alanine Supplementation and Training on the Muscle Carnosine Content in Human v. lateralis, and the Effect of This on Exercise Performance," Amino Acids 29:12-13 (2005).
Rajkumar and Ramakrishnan, "Infrared and Roman Spectra of L-Valine Nitrate and L-Leucine Nitrate", Journal of Raman Spectroscopy, 2000. p. 1107-1112, vol. 31. John Wiley & SonsLtd.
Rajkumar et al., "Infrared and Raman spectra of DL-aspartic acid nitrate monohydrate," Spectrochimica Acta Part A, 54:1527-1532, 1998.
Ramaswamy et al."Vibrational spectroscopic studies of L-argininium dinitrate," J. Raman Spectrosc. 34:50-56 (2003).
Rao et al."Structure and Conformational Aspects of the Nitrates of Amino Acids and Peptides. I. Crystal Structure of Glycylglycine Nitrate," Acta Cryst. B29:2379-2388 (1973).
Riens et al., "Amino Acid and Sucrose Content Determined in the Cytosolic, Chloroplastic, and Vacuolar Compartments and in the Phloem Sap of Spinach Leaves1", Plant Physiol. (1991) 97, 227-233, Apr. 6, 1991.
Rimando et al., "Determination of Citrulline in Watermelon Rind", Journal of Chromatography A, 1078 (2005) 196-200, May 2, 2005.
Rombauer, Irma S., "Joy of Cooking", 75th Anniversary, Scribner, New York, 2006, p. 163 (2006).
Romero et al., "Therapeutic Use of Citrulline in Cardiovascular Disease," Cardiovascular Drug Reviews 24(3-4):275-290 (2006).
Rosen et al. "Nutrient Management for Commercial Fruit & Vegetable Crops in Minnesota" University of Minnesota extension Service, 2005 pp. 35-36 <https://conservancy.umn.edu/bitstream/handle/11299/51272/5886.pdf?sequence=1>.
RSPRegenBCAA, 2006.
Ruel et al., "Modulation in Angiogenic Therapy randomized controlled trial," J Thorac Cardiovasc Surg 135:762-770 (2008).
Rytlewski et al., Effects of prolonged oral supplementation with L-arginine on blood pressure and nitric oxide synthesis in preeclampsia, Eur J Clin Lnvest 35(1):32-37 (2005).
Rytlewski et al.European Journal of Obstetrics & Gynecology and Reproductive Biology 138:23-28 (2008).
S. Moncada, et al., The L-Arginine:Nit ic Oxide Pathway, Journal of Cardiovascular Pharmacology, 17(Suppl. 3):S 1-S9 1991).
S. Ramaswamy, Acta Cryst., E58, 646-648 (2002).
Sader et al., "Endothelial Function, Vascular Reactivity and Gender Differences in the Cardiovascular System", Cardiovascular Research 53 (2002) 597-604, Aug. 21, 2001.

(56) References Cited

OTHER PUBLICATIONS

Sale et al. Effect of beta-alanine supplementation on muscle carnosine concentrations and exercise performance. Amino Acids, 39:321-333, 2010.
San Corporation dietary supplement containing creatine nitrate, 2006.
Santamaria et al. "A survey of nitrate and oxalate content in fresh vegetables" Journal of the Science of Food and Agriculture, 1999, vol. 79, 1882-1888. (Year: 1999).
Sastre et al."Metabolism of agmatine in macrophages: modulation by lipopolysaccharide and inhibitory cytokines," Biochem. J. 330:1405-1409 (1998).
Schaefer et al., Intl. J. of Sports Medicine, 2002, 23(6):403-407.
Schulbach et. al., "Guide to nitrogen quick-tests for vegetables wit the 'cardy' nitrate meter" FREP Contract # 95/0582.
Schulz et al., "Functional and Biochemical Analysis of Endothelial (Dys)function and NO/cGMP Signaling in Human Blood Vessels with and without Nitroglycerin Pretreatment," Circulation 105:1170-1175 (2002).
Schwedhelm et al., "Pharmacokinetic and pharmacodynamics properties of oral L-citrulline and L-arginine: impact on nitric oxide metabolism," Br J Clin Pharmacol 65(1):51-59 (2007).
Sen et al. Journal of Association of Official Analytical Chemists, 61(6): 1389-1394, 1978.
Shen et al. publication, Acta Physiol. Scand, 2000, 168(4): 675-86.
Shen, W., Nitric oxide production and NO synthase gene expression contribute to vascular regulation during exercise, Med. Sri Sports Fxerc., vol. 27, No. 8, pp. 1125 1134(Aug. 1995).
Shiraki et al., "The hypotensive mechanisms of the new anti-anginal drugN-(2-Hydroxyethyl) Nicotinamide Nitrate (SG-75) in beagle dogs," Japan. J. Pharmacol. vol. 31:921-929 (1981).
Simplico et al. "Prodrus for Amines", Molecules 2008, vol. 13, pp. 519-547.
Slart et al., "Nitrate Administration Increases Blood Flow in Dysfunctional but Viable Myocardium, Leading to Improved Assessment of Myocardial Viability: A Pet Study," J Nucl Med 47:1307-1311 (2006).
Smith et al."Nitric oxide precursors and congenital heart surgery: A randomized controlled trial of oral citrulline," J Thorac Cardioasc Surg 132:58-65 (2006).
Sridhar et al, "L-Aspartic Acid Nitrate-L-Aspartic Acid," Acta Cryst. E58:01372-01374 (2002).
Srinivasan et al., "L-phenylalanine-nitric acid (2/1)," Acta Crystallographica E57:0916-0918, 2000.
Stephany et al. "The Intake of Nitrate, Nitrite and Volitile N-Nitrosamins and the Occurrence of Volatile N-nitrosamines in human urine and Veal Calves" IARC Scientific Publications, Jan. 1978, vol. 19, pp. 443-460. (Year: 1978).
Stephenson, T., "How children's responses to drugs differe from adults," Br. J. Clin. Pharmacol., 59(6):670-673, 2005.
Stetson, C., "Characteristics of Adults vs. Children." [retrieved on May 4, 2016], Retrieved from the Internet <URL: http://www.ehow.com/info 8501147 characteristics-adults-vs-children.html>.
Stout et al., "Effects of B-Alanine Supplementation on the onset of Neuromuscular Fatigue and Ventilatory Threshold in Women", Amino Acids (2006), Springer-Verlag 2006.
Stryer, Lubert, Biochemistry, Third Edition, W.H. Freeman and Company, New York: 1988, pp. 16-23, 233-236, 500-502 and 934-936.
Sugino et al., "L-ornithine supplementation attenuates physical fatigue in healthy volunteers by modulating lipid and amino acid metabolism," Nutrition Research, 2008, 28:738-743.
Summary of Studies of B-Alanine and sports performance, "Studies of B-Alanine Supplementation on Exercise Capacity or Performance", Nov. 2011.
Swensen et al. publication, Intl. J. of Sports medicine, 1994, 15(7):430-4.
Takahashi et al."Characterization of the influence of nitric oxide donors on intestinal absorption of macromolecules," International Journal of Pharmaceutics 286:89-97 (2004).

Tan et al., "Taurine protects against low-density lipoprotein-induced endothelial dysfunction by the DDAH/ADMA pathway," Vascular Pharmacology 46:338-345 (2007).
Tannebaum et al., "Inhibition of nitrosamine formation by ascorbic acid," Am. J. Clin. Nutr. 53: 2475-2505, 1991.
Tao, Guo-Hong et al., new Generation Ionic Liquids: Cations Derived From Amino Acids, The Royal Society of Chemistry, ChemComm, Jun. 9, 2005, 3562-3564.
Taurine from Nutrabio, 2006.
Terzyan et al., "L-Arginine Nitrates," Journal of Molecular Structure 687:111-117 (2004).
Thandani, U. "Challenges with Nitrate Therpy and Nitrate Tolerance: Prevalence , Prevention, and Clinical Relevance" Am J Cardiovasc Drugs, 2014, vol. 14, pp. 287-301. (Year: 2014).
The product APS Creatine Nitrate , for sale, 2014.
The product Isoleucine nitrate power with a Brand name Hobid, for sale, 2014.
The product L-glutamine nitrate power with a Brand name Hobid, for sale, 2014.
The product L-Leucine nitrate power by Body Ripped, for sale, 2014.
The product valine nitrate power with a Brand name Hobid, for sale, 2014.
U.S. Food & Drug Administration document with respect to 21 CFR §184.1878 for thiamine mononitrate (Year: 2018).
Urakami, M. et al., "Relationship between Structure and Permeability of Tryptophan Derivatives Across Human Intestinal Epithelial (Caco-2) Cells.", Z. Naturforsch., (2003), vol. 58C, pp. 135-142, XP055127040.
USDA and HHS Agencies Work Together to Examine the Jurisdiction of Certain Food Categories, USDA & FDA, 2005.
USDA Regulation 64 FR 72168, Food Ingredients and Sources of radiation Listed or Approved for Use in the Production of Meat and Poultry, 1999.
Vandenberghe et al. publication, J. Appl physiol, 1997, 83:2055-2063.
Vytech advertisement for "Nitrobol Extreme" Joe Welder's Muscle & Fitness, Sep. 2005.
Walker et al., Food additive and Contaminants, 1990, 7(6):717-768.
Watt et al., "The Chemist, A Monthly Journal of Chemical & Physical Science", vol. 1, London; Samuel Highley, 32 Fleet Street, 1854.
Watts, "A Dictionary of Chemistry and the Allied Branches of Other Sciences", Library of the University of California, Aug. 1808.
Weitzberg et al., "Dietary Nitrate—A Slow Train Coming", J Physiol 589.22 (2011) pp. 5333-5533, 2011 The Authors. Journal compilation, 2011 The Physiological Society.
Wheatley et al., "Arginine deprivation and tumor cell death arginase and its inhibition," Molecular and Cellular Biochemistry, 244: 177-185, 2003.
White, Handler and Smith, Principles of Biochemistry, Fifth Edition, McGrawy-Hill, New York: 1973, pp. 89-95.
Wilson et al., "Beta-Alanine-Bad Ass Supplement", Iron Man Magazine, Oct. 13, 2010.
Winter et al., "N-Nitrosamine Generation From Ingested Nitrate Via Nitric Oxide in Subjects With and Without Gastroesophageal Reflux," Gastroenterology, 2007, 133:164-174.
Ximenes, M. I. N., et al., "Polarographic determination of nitrate in vegetables" Talanta 51 (2000) 49-56.
Xu et al., "Composite medical preparation for promoting hair growth," CAS: 143:103285 (2005).
Zhang et al. publication, Amino acids, 2004, 26:203-207.
Zhu et al., "Expression of Human Arginine Decarboxylase, the Biosynthetic Enzyme for Agmatine", NIH Public Access, Biochim Biophys Acta. Jan. 22, 2004; 1670(2): 156-164.
Ziegenfuss et al., "Effect of a Supplement Containing Primarily Beta Alanine, Arginine, Creatine Malate, and Glycerol Monostearate on Exercise-Induced Changes in Lean Mass of the Arms", Journal of the International Society of Sports Nutrition 2008, 5(Suppl 1):P16 doi:10.1186/1550-2783-5-S1-P16.
Teragawa et al. (Heart, 86:212-216, 2001) Magnesium causes nitric oxide independent coronary artery vasodilation in humans.

(56) References Cited

OTHER PUBLICATIONS

ATSDR Case Studies in Environmental Medicine Nitrate/Nitrite Toxicity published by the U.S. Department of Health and Human Services on Dec. 5, 2013. ATSDR Case Studies in Environmental Medicine Nitrate/Nitrite Toxicity.

Kouzenkov V.S. et al. Sodium potassium effect on development of nerological deficiency in experimental model of 1 brain ishemia), non-official translation (Moscow University Bulletin Ser. 16. Biology. 2014, No. 4, pp. 9-14), p. 9, p. 10, col. 1, paragraph 3—col. 2, paragraph 3, p. 12, col. 2, paragraph 2—p. 13, col. 1, paragraph 1, figs. 1-4.

Professor of Udinsev. Nitrates and physical performance. Siberian fiber. 09.08.2018. [on-line] [ retrieved on 2p/29/2020] (Retrieved from the Internet: https://tfzp.ru/zdorovyj-obraz-zhizni/v/nitraty/nitraty-i-fizicheskaya-abotosposobnosto, p. 2, paragraph 2—p. 3, paragraph 1, p. 4, paragraph 1.

A. Patrician et al., "Dietary nitrate enhances arterial oxygen saturation after dynamic apnea", Scand J Med Sci Sports, (20170000), vol. 27, doi:10.1111/sms.12684, pp. 622-626, XP055943939.

Acetyl/propionyl Carnitine from BodyBuilding, 2006. 1 page.

Curry, M.D., Steven, "Methemoglobinemia", Ann Emerg Med, 11, 214-221, 1982.

Dymatize® Xpand 2x®, Fruit Punch, Dymatize GNC, www.gnc.com/product/index.jsp?productId=13180805, Jun. 13, 2013. 4 pages.

Ekblom et al, The New England Journal of medicine, 2006, 335; 26, pp. 2792-2793.

Gago et al., Red wine-dependent reduction of nitrite to nitric oxide in the stomach, Free Radical Biology and Medicine 43:1233-1242, 2007. 10 pages.

George Barger, M.A., D.Sc., "The Simpler Natural Bases", Monographs on Biochemistry, U.C.D. Library, Nov. 23, 1960, Digitized 2007. 232 pages.

Gonzalez, "Migraines Are Correlated with Higher Levels of Nitrate-, Nitrite-, and Nitric Oxide-Reducing Oral Microbes in the American Gut Project Cohort". mSystems. Oct. 18, 2016;1(5):e00105-16. doi: 10.1128/mSystems.00105-16. Erratum in: mSystems. ( Year: 2016).

Gwartney, "On the Horizon: A Glimpse into the Future of Supplementation," in Pump magazine, November/December. (Year: 1998) 4 pages.

H. Yamasaki, "Blood nitrate and nitrite modulating nitric oxide bioavailability: potential therapeutic functions in COVID-19", Nitric Oxide, vol. 103, doi:https://doi.org/10.1016/j.niox. 2020.07.00 5, (Jul. 23, 2020), pp. 29-30, XP055943941.

Mirvish, SS (Annals of New York Academy of Sciences. 1975; pp. 175-180) (Year: 1975).

Qin, Yu, et al., "Portable Nitric Oxide (NO) Generator Based on Electrochemical Reduction of Nitrite for Potential Applications in Inhaled NO Therapy and Cardiopulmonary Bypass Surgery", Mol Pharmaceutics, http://pubs.acs.org, 37 pages, 2017.

Shinbo, Toshihiro, et al., "Breathing nitric oxide plus hydrogen gas reduces ischemia-reperfusion injury and nitrotyrosine production in murine heart", Am J Physiol Heart Circ Physiol, 305, H542-H550, 2013.

Ashenhurst ([online] retrieved on Aug. 18, 2023 from: https://www.masterorganicchemistry.com/2018/02/28/amides-properties-synthesis-and-nomenclature/ 3 pages) (Year: 2023).

Carbonyl diamine [online] retrieved on Aug. 18, 2023 from: https://www.chembk.com/en/chem/Carbonyl%20diamine;1 page. (Year: 2023).

Vilskersts. R. et al. Magnesium nitrate attenuates blood pressure rise in SHR rats. Magnes Res. Jan.-Mar. 2014; 27(1):16-24. doi:10.1684/mrh.2014.0358. PMID: 24827813.

Zhang et al. Effects of Magnesium Supplementation on Blood Pressure: A Meta-Analysis of Randomized Double-Blind Placebo-Controlled Trials. Hypertension. Aug. 2016;68(2):324-33. doi: 10.1161/HYPERTENSIONAHA.116.07664. Epub Jul. 11, 2016. PMID: 27402922.

B. Pejin et al., Heavy metal content of a medicinal moss tea for hypertension, Natural Product Research, Taylor & Francis, 2012 vol. 26, No. 23, 2239 2242.

B. Pejin et al., Mineral Content of a Moss Tea for Hypertention, Italian Journal of Food Science, Italy Codon Publications, 2013 vol. 25, 235 237.

Galachiev S.M. et al: Possibilities of endogenous formation of nitrosamines in gastric juice In Vitro, Samara Scientific Center of the Russian Academy of Sciences Bulletin, 2011, vol. 13, No. 1(7), pp. 1678-1680.

Kumar et al., "Chemical Denitrificaiton of Water by Zero-Valent Magnesium Powder." Journal of Hazardous Materials B135 (2006) 112-121). (Year: 2006).

Magnesium, Britannica Online Encyclopedia [online] retrieved on May 30, 24 from: https://www.britannica.com/print/article/356899; 3 pages.) (Year: 2024).

Raymond et al., "Effects of Acute Red Spinach Extract Ingestion on Repeated Sprint Performance in Division I NCAA Female Soccer Athletes." (Oxygen 2023;3:133-142). (Year: 2023).

Bhatia A.L., Jain Manish, "Amaranthus paniculatus (Linn.) improves learning after radiation stress", Journal of Ethnopharmacology, Elsevier Ireland Ltd, IE, IE , (Mar. 1, 2003), vol. 85, No. 1, doi:10.1016/S0378-8741(02)00337-9, ISSN 0378-8741, pp. 73-79, XP093036506.

Hu, "A Study on Elemental Irons and Iron Compounds for Food Fortification", 18th International Congress of Nutrition, pp. 1-9, Sep. 2005.

Hurrell et al. The Usefulness of Elemental Iron for Cereal Flour Fortification: A Sustain Task Force Report, Nutrition Reviews, Dec. 2002, pp. 391-406. (Year: 2002).

"Coadministration" Collins English Dictionary; [online] retrieved on Mar. 27, 2025 from: https://www.collinsdictionary.com/us/dictionary/ english/coadministration; 1 page. (Year: 2025).

Chauhan et al., "Advancements in the Co-Formulation of Biologic Therapeutics", Journal of Controlled Release, 2020;327:397-405. (Year: 2020).

"Co-administration" Cambridge English Dictionary; [online] retrieved on Mar. 27, 2025 from: https://dictionary.cambridge.org/us/dictionary/ english/co-administration; 1 page. (Year: 2025).

Astill, B. D. et al., "Phenolic Antioxidants amd the Inhibition of Hepatotoxicity from N-Dimethylnitrosamine Formed in Situ in the Rat Stomach" Food and Cosmetics Toxicology, Pergamon Press, Oxfrod, Grat Britain, vol. 15, No. 3, Jan. 1, 1977, pp. 167-171.

Body S. C. et al., "Nitric Oxide: Delivery, Measurement, and Clinical Application", Journal of Cardiothoracic and Vascular Anesthesia, Elsevier, Amsterdam, NL, vol. 9, No. 6, Jan. 1, 1995, pp. 748-763, XP009009779, ISSN: 1053-0770, DOI: 10.1016/S1053-0770(05)80242-3.

Gui, Iai et al., "Reduction of N-Nitrosodimethylamine with Granular Iron and Nickel-Enhanced Iron. 1. Pathways and Kinetics", Environmental Science & Technology, vol. 34, No. 16, Jul. 14, 2000, pahes 3489-3494.

HAN Ying et al., "Reduction of N-Nitrosodimethylamine with zero-valent zinc", Water Research, vol. 47, No. 1, Jan. 1, 2013 (Jan. 1, 2013), pp. 216-224, XP093221894, Amsterdam, NL ISSN: 0043-1354, DOI: 10.1016/j.watres.2012.09.043.

Hyde, PJ et al., "The Reaction Between Aluminum Metal and Aqueous Solutions of the Nitrite Ion", Austalian Journal of Chemistry, vol. 33, No. 1, Jan. 1, 1980 (Jan. 1, 1980), p. 169, XP093223550, AU, ISSN:0004-9425, DOI: 10.1071/CH9800169.

Lakhmir Singh ([online] retrieved on Dec. 18, 2024 from: https://www.google.com/books/edition/Lakhmir_Singh_s_Science_for_Class_8/ z2wtDAAAQBAJ?hl=en&gbpv=0; 2016; p. 70) (Year: 2016).

U.S. Department of Commerce, "The Atmosphere", National Oceanic and Atmospheric Administration , retrieved on Nov. 13, 2024, https://www.noaa.gov/jetstream/atmosphere.

Westerhoff P. et al., "Nitrate removal in zero-valent iron packed columns", Water Research, Elsevier, Amsterdam, Nl, vol. 37, No. 8, Apr. 1, 2003 (Apr. 1, 2003), pp. 1818-1830, XP004419942, ISSN: 0043-1354, DOI: 10.1016/S0043-1354(02)00539-0.

Zapol, Warren M. et al., "Inhaled Nitric Oxide", British Journal of Pharmacology, Dec. 31, 2019, pp. 246-255, XP093223242, DOI: 10.1111/bph.v176.2/issuetoc.

(56) References Cited

OTHER PUBLICATIONS

Zhang Z. et al., "Reductive denitrification kinetics of nitrite by zero-valent iron", Desalination, Elsevier, Amsterdam, NL, vol. 257, No. 1-3, Jul. 1, 2010 (Jul. 1, 2010), pp. 158-162, XP027020374, ISSN: 0011-9164.
English translation of patent CR 20140504 A2; Dec. 4, 2015.
Sheiner et. al., "Pharmacokinetic/Pharmacodynamic Modeling in Drug Development", Annu. Rev. Pharmacol. Toxicol., vol. 49, pp. 67-95. 2000.
Hanson et al., Plant Physiol., vol. 70, pp. 1191-1198, publ. 1982 (Year: 1982).
Santamaria, J. of the Science of Food and Agriculture, vol. 86, pp. 10-17, publ. Nov. 1, 2005 (Year: 2005).
Food and Agriculture Organization, Technology of production of edible flours and protein products from soybeans, Chapter 1, "The Soybean", pp. 1-12, publ. Jan. 31, 2001 (Year: 2001).
Wu Chun et al., "Study on the Inhibition of Nitrosamine Synthesis by Quercetin-Zinc(II) Complexes in Vitro and In Vitro," Food Science, vol. 28, No. 9, pp. 35-38. Dec. 31, 2007.
Chen Zhonglin, "Efficacy of Zero-valentZinc in Reducing Edema with Trace Nitrosodimethylamine," Journal of harbin Institute of technology, vol. 42, No. 12, pp. 1879-1882. Dec. 31, 2010.

\* cited by examiner

METHOD OF ADMINISTERING NITRIC OXIDE GAS

CROSS REFERENCE TO RELATED APPLICATIONS

This application claims priority to PCT Application No. PCT/US22/16231, filed Feb. 11, 2022, which claims priority to both U.S. Provisional Patent Application No. 63/148,523, filed on Feb. 11, 2021, and U.S. Provisional Patent Application No. 63/180,039, filed on Apr. 26, 2021, the contents of each of which are incorporated herein by reference in their entireties.

BACKGROUND

Inhaled nitric oxide (NO) is used to treat a spectrum of cardiopulmonary conditions, including pulmonary hypertension in children and adults. Inhaled NO gas has also been suggested as a treatment in hospitals for COVID-19 patients with low oxygen levels and difficulty breathing. Many mechanisms have been suggested for the therapeutic benefits of nitric oxide in COVID-19 patients (FIG. 1): inhaled NO gas is known to be a selective pulmonary vasodilator. NO can improve right heart function and decrease pulmonary vasoconstriction in subjects with acute and chronic pulmonary hypertension. Breathing NO gas is shown to improve ventilation and provide bronchodilation in mild asthmatic subjects. NO gas in the alveolar space improves oxygenation by increasing blood flow to ventilated lung units (i.e., improvement of ventilation perfusion matching). In vitro and in vivo data showed that NO gas can act as an anti-inflammatory and antithrombotic agent. NO donors and NO gas showed antibacterial and antiviral properties in in vitro studies and early clinical investigations.

However, the widespread use of inhaled NO is limited by logistical and financial barriers. Currently, inhaled NO therapy requires the use of specialized ventilators and NO canisters making it costly and impractical for home use. Inhaled nitric oxide is a very costly therapy. The direct cost of NO is at least $100 per hour of use regardless of dose. An average COVID-19 patient can need over 80 hours of treatment, ramping up the cost to thousands of dollars. Thus, despite the existence of studies showing benefits of NO therapy in COVID-19 patients, practical considerations have so far prevented the widespread use of the therapy and kept it mostly to critically ill patients admitted to hospitals. Accordingly, there is a need for more economical and convenient methods of producing nitric oxide and administering it to the patient, especially methods that do not require the use of specialized equipment.

However, in spite of its therapeutic benefits, NO therapy is unfortunately accompanied with potentially serious exposure to toxic chemicals. Methemoglobinemia is also a common occurrence of nitric oxide therapy (Raut and Maheshwari, "Inhaled nitric oxide, methemoglobinemia, and route of delivery," *Saudi J Anaesth.* 2017, 11(3):364). However, because of issues associated with NO gas inhalation, such as methemoglobinemia and formation of nitrogen dioxide, emerging evidence brings into question whether NO inhalation can improve mortality in COVID-19 patients (Prakash et al., "Efficacy and safety of inhaled nitric oxide in the treatment of severe/critical COVID-19 patients: A systematic review." *Indian Journal of Pharmacology,* 2021, 53(3): 236-243). Methemoglobinemia is an increased concern in COVID-19 patients, as these patients have been documented to develop methemoglobinemia from the disease itself (Naymagon et al., "The emergence of methemoglobinemia amidst the COVID-19 pandemic." *Am J Hematol.,* 2020, 95(8):E196-E197).

The current method of NO therapy also unavoidably exposes patients to $NO_2$ gas, which is considered a major toxic air pollutant and has no therapeutic value. NO rapidly oxidizes in the presence of oxygen to $NO_2$ (Glasson and Tuesday, "The Atmospheric Thermal Oxidation of Nitric Oxide, *J. Am. Chem. Soc.,* 1963, 85(19): 2901-2904). Whereas the Occupational Safety and Health Administration (OSHA) has set a limit of 25 ppm NO in workplace air during an 8-hour workday, 40-hour work week, the limit for just a 15-minute exposure to $NO_2$ is 5 ppm in workplace air. This is because most biochemical studies show appreciable toxic effects only after acute or sub-chronic exposure of nitrogen dioxide exceeding 3160 μg/m³ (2 ppm) (Jarvis et al. "Nitrogen dioxide." In: WHO Guidelines for Indoor Air Quality: Selected Pollutants. Geneva: World Health Organization; 2010. 5). To minimize the formation of $NO_2$ in NO therapy, the NO stored in bottle must be oxygen-free, which increases the hurdles towards accessible NO therapy. Even with these precautions, the $NO_2$ exposure is still too high to not be of concern for patients who need NO therapy.

Van Meurs et al. noted that the use of inhaled NO in premature infants with severe respiratory failure at NO dose levels of 5 to 10 ppm exposed the patients to $NO_2$ concentrations of at least 3 ppm in four infants and 5 ppm in two infants, while no infants in the placebo group had elevated $NO_2$ concentrations (Van Murs et al., "Inhaled Nitric Oxide for Premature Infants with Severe Respiratory Failure," *N Engl J Med,* 2005; 353:13-22). Petit et al found that administration of inhaled NO with the existing compressed gas delivery system results in $NO_2$ generation when NO is diluted with 02-enriched air before delivery to the patient (Petit et al., "The Pathophysiological of Nitrogen Dioxide During Inhaled Nitric Oxide Therapy," *ASAIO Journal,* 2017, 63(1): 7-13). Petit et al. also noted that the $NO_2$ inhaled by the patient oxidizes protective antioxidants within the epithelial lining fluid (ELF) and triggers extracellular damage in the airways, which possibly leads to edema, bronchoconstriction, and a reduced forced expiratory volume in 1 second. According to the Agency for Toxic Substances and Disease Registry, exposure to low concentrations of $NO_2$ gas may initially cause mild shortness of breath, but after a period of hours to days, those exposed may suffer bronchospasm and pulmonary edema. Exposure to higher (>10 ppm) concentrations of $NO_2$ gas may induce an immediate response in a subject that may include coughing, fatigue, nausea, choking, headache, abdominal pain, and difficulty breathing. A symptom-free period of 3 to 30 hours may then be followed by the onset of pulmonary edema with anxiety, mental confusion, lethargy, and loss of consciousness. If one survives the exposure to higher concentration so $NO_2$, the episode may be followed several weeks later by bronchiolitis obliterans. Inhalation of very high concentrations (>50 ppm) can rapidly cause burns, spasms, swelling of tissues in the throat, upper airway obstruction, and even death. Accordingly, there is also a need for safer methods of administering nitric oxide to the patient.

SUMMARY

The disclosure relates to compositions, kits, and methods related to generating NO gas for NO inhalation therapy. In one aspect, the methods of generating NO gas for NO inhalation therapy comprises combining a source of nitrate anion and an elemental metal in an acidic solution in a vessel capable of housing liquid and gaseous constituents thereby producing NO gas. In another aspects, the methods of safely generating NO gas for NO inhalation therapy comprises combining a source of nitrite anion and an elemental metal in an acidic solution in a vessel capable of housing liquid and gaseous constituents thereby producing NO gas. In certain implementations, the methods further comprise administering the NO gas to a subject via a vessel capable of housing liquid and gas constituents, for example, where the vessel capable of housing liquid and gas constituents is a water pipe. In some aspects, administering the NO gas to the subject via the vessel capable of housing liquid and gas constituents comprises the subject inhaling from in the water pipe. In certain implementations, the water pipe is connected to a respirator. The subject being administered the NO gas is suffering from difficulty breathing, suffering from migraine, has below 95 oxygen saturation levels, is seeking improved athletic performance, is seeking increased endurance, or is seeking improved mental performance.

The elemental metal is selected from the group consisting of: elemental magnesium, elemental calcium, elemental lithium, elemental zinc, elemental potassium, elemental sodium, elemental beryllium, elemental barium, and elemental iron. In certain embodiments, the elemental metal is elemental magnesium and/or elemental zinc. The pH of the acidic solution is between 0.1 and 6.9, for example, between 2 and 4. In certain implementations, method further comprises dissolving an acid powder in a solvent (for example water) to produce the acidic solution. In some aspects, the acid powder is citric acid, malic acid, or fumaric acid. In a particular embodiment, the acidic solution is produced form dissolving the acid powder in 1 ml to 10000 ml water.

In some aspects of the methods of generating NO gas for NO inhalation therapy, the source of nitrate anion is a nitrate salt or a botanical source of nitrate. In such embodiments, an effective amount of the source of nitrate anion and an effective amount of the elemental metal are combined in the acidic solution to produce an effective amount of NO gas, wherein the effective amount of elemental metal is between 1 mg and 2000 mg and the effective amount of the source of nitrate anion provides between 30 mg and 4000 mg nitrate anion. In certain implementations, an effective amount of the source of nitrate anion and an effective amount of the elemental metal are combined in the acid solution to produce an effective amount of NO gas, in a ratio from 10:1 to 1:10. In some implementations, an effective amount of the source of nitrate anion and an effective amount of the elemental metal are combined in the acid solution to produce at least 5 ppm NO gas and 1000 ppm $H_2$ gas. In some embodiments, the gas constituents produced by combining the source of nitrate anion and the elemental metal in the acidic solution further comprise nitroxyl gas.

In some aspects of the methods of generating NO gas for NO inhalation therapy, the source of nitrite anion is a nitrite salt or a botanical source of nitrite. In such embodiments, wherein an effective amount of the source of nitrite anion and an effective amount of the elemental metal are combined in the acidic solution to produce an effective amount of NO gas, the effective amount of elemental metal is between 1 mg and 2000 mg and the effective amount of the source of nitrite anion provides between 1 mg and 1000 mg nitrite anion. In certain implementations, an effective amount of the source of nitrite anion and an effective amount of the elemental metal are combined in the acid solution to produce an effective amount of NO gas, in a ratio from 10:1 to 1:10. Ins some implementations, an effective amount of the source of nitrate anion and an effective amount of the elemental metal are combined in the acid solution to produce at least 5 ppm NO gas and 1000 ppm $H_2$ gas. In some embodiments, the gas constituents produced by combining the source of nitrate anion and the elemental metal in the acidic solution further comprise nitroxyl gas.

The above-described methods of generating NO gas for NO inhalation therapy do not generate unsafe levels of $NO_2$ gas. For example, the levels of $NO_2$ gas produced by combining the source of nitrite anion and the elemental metal in the acidic solution do not exceed 10 ppm, do not exceed 5 ppm, or do not exceed 2 ppm. In some embodiments, the gas constituents produced by combining the source of nitrite anion and the elemental metal in the acidic solution do not comprise any $NO_2$ gas.

The compositions related to generating NO gas for NO inhalation therapy described herein comprise a nitrite and an elemental metal. In some aspects, the composition comprises an acid. The elemental metal in the composition is selected from the group consisting of: elemental magnesium, elemental calcium, elemental lithium, elemental zinc, elemental sodium, elemental potassium, elemental beryllium, elemental rubidium, elemental cesium, elemental aluminum, elemental gallium, elemental indium, elemental tin, elemental bismuth, elemental scandium, elemental titanium, elemental vanadium, elemental chromium, elemental manganese, elemental cobalt, elemental manganese, elemental scandium, elemental titanium, nickel, elemental copper, elemental zinc, elemental yttrium, elemental zirconium, elemental niobium, elemental molybdenum, elemental technetium, elemental ruthenium, elemental rhodium, elemental palladium, elemental silver, elemental cadmium, elemental lanthanum, elemental hafnium, elemental tantalum, elemental tungsten, elemental rhenium, elemental osmium, elemental iridium, elemental platinum, elemental gold, elemental manganese and elemental iron. In some aspects, the nitrite in the composition is a nitrite salt, for example, sodium nitrite or potassium nitrite. In other aspects, the nitrite in the composition is a botanical source of nitrite standardized for nitrite content, for example, beetroot powder.

In some aspects, the composition is in the form of a capsule, a cachet, a pill, a tablet, a powder, a granule, a pellet, a bead, a particle, a troche, a lozenge, a pastille, a solution, an elixir, a syrup, a tincture, a suspension, an emulsion, a mouthwash, a spray, a drop, an ointment, a cream, a gel, a paste, a transdermal patch, a suppository, a pessary, cream, a gel, a paste, a foam, and combinations thereof. The composition may further comprise an acceptable additive and/or an acceptable carrier. The acceptable additive may be selected from at least one member from the group consisting of: a solubilizer, an enzyme inhibiting agent, an anticoagulant, an antifoaming agent, an antioxidant, a coloring agent, a coolant, a cryoprotectant, a hydrogen bonding agent, a flavoring agent, a plasticizer, a preservative, a sweetener, and a thickener. The acceptable carrier may be selected from at least one member from the group consisting of: an excipient, a lubricant, a binder, a disintegrator, a diluent, an extender, a solvent, a suspending agent, a dissolution aid, an isotonization agent, a buffering agent, a soothing agent, and an amphipathic lipid delivery system. In some aspects, the composition is in a form suitable for oral administration. In other aspects, the composition is in a form suitable for inhalation of the gases produced when in contact with an acidified solvent.

In some aspects, the composition comprises an effective amount of nitrite to produce a therapeutic effect and an effective amount of elemental metal to prevent or reduce nitrite toxicity. The therapeutic effect of the nitrite may be reducing blood pressure or treating and/or alleviating symptoms of a respiratory illness. The respiratory illness may be an infection by a coronavirus, an influenza virus, respiratory syncytial virus, *Streptococcus pneumoniae, Haemophilus influenzae* type b, *Pneumocystis jiroveci*, a fungus, or a protozoa. In certain embodiments of the therapeutic composition, the effective amount of nitrite is 1-1000 mg and the effective amount of elemental metal is 1-10000 mg. In other embodiments, the effective amount of nitrite is 5-200 mg and the effective amount of elemental metal is 5-1000 mg. In a particular embodiment of the therapeutic composition, the effective amount of nitrite is 30-100 mg and the effective amount of elemental metal is 10-400 mg.

In a particular embodiment of the therapeutic composition, the nitrite is packaged in a capsule, a cachet, a pill, a tablet, a powder, a granule, a pellet, a bead, a particle, a troche, or a pastille; and the elemental metal is packaged in a capsule, a cachet, a pill, a tablet, a powder, a granule, a pellet, a bead, a particle, a troche, or a pastille. In another embodiment, the nitrite is packaged in a capsule, a cachet, a pill, a tablet, a powder, a granule, a pellet, a bead, a particle, a troche, or a pastille; the elemental metal is packaged in a capsule, a cachet, a pill, a tablet, a powder, a granule, a pellet, a bead, a particle, a troche, or a pastille; and the acid is packaged separately from the nitrite and the elemental metal. In some aspects, the nitrite, the elemental metal, and the acid are in solid forms. In a particular embodiment, the nitrite and the elemental metal are packaged together, for example, in one capsule, one cachet, one pill, or one tablet.

The kits for safely administering NO gas to a patient described herein comprise a nitrite or nitrate; an elemental metal, wherein the nitrite and/or nitrate and the elemental metal are packaged together; an acid; and instructions for combining the nitrite, the elemental metal, and the acid to generate NO gas without generating $NO_2$ gas and for administering the generated NO gas to a patient. In some embodiments, the kit further comprises a vessel capable of housing liquid and gas constituents, for example, a water pipe. In some aspects, the nitrite or the nitrate in the kit is a salt, for example, a nitrite salt or a nitrate salt. Exemplary salts include sodium nitrite, potassium nitrite, sodium nitrate, potassium nitrate. The elemental metal in the kit is selected from the group consisting of: elemental magnesium, elemental calcium, elemental lithium, elemental zinc, elemental sodium, elemental potassium, elemental beryllium, elemental rubidium, elemental cesium, elemental aluminum, elemental gallium, elemental indium, elemental tin, elemental bismuth, elemental scandium, elemental titanium, elemental vanadium, elemental chromium, elemental manganese, elemental cobalt, elemental manganese, elemental scandium, elemental titanium, nickel, elemental copper, elemental zinc, elemental yttrium, elemental zirconium, elemental niobium, elemental molybdenum, elemental technetium, elemental ruthenium, elemental rhodium, elemental palladium, elemental silver, elemental cadmium, elemental lanthanum, elemental hafnium, elemental tantalum, elemental tungsten, elemental rhenium, elemental osmium, elemental iridium, elemental platinum, elemental gold, elemental manganese and elemental iron.

Also disclosed are methods of administering inhaled nitric oxide gas with reduced toxicity to a subject. In some aspects, the reduced toxicity manifests as reduced lung injury compared to the amount of lung injury that would occur by administration of NO gas by itself at the same concentration or the subject's blood methemoglobin level does not exceed 2%. The method comprises administering to a subject nitric oxide gas and administering to the subject hydrogen gas. In certain implementations, the methods further comprise administering to the subject nitroxyl gas. In some aspects, methods of therapeutically administering inhaled NO gas are described that comprise co-administering an effective amount of hydrogen gas with NO gas to a subject. The effective amount of hydrogen is an amount sufficient to reduce or prevent the formation of $NO_2$ during administration of NO gas to the subject. In some aspects, the effective amount of hydrogen gas is at least 1000 ppm. In certain implementations, the method comprises mixing an elemental metal with a nitrate and/or nitrite in an acidified solvent, whereby NO gas and the effective amount of hydrogen gas are produced and administered to the subject via inhalation.

Accordingly, methods of reducing inhaled NO toxicity comprising inhaling NO with an effective amount of hydrogen to reduce NO toxicity (for example, lung tissue damage or an increase in nitrotyrosine levels at the tissues exposed to NO) are described. Thus, a composition comprising nitric oxide gas and hydrogen gas is described. In some aspects, nitrite toxicity is manifested as development of methemoglobinemia. Methods of preventing and/or treating methemoglobinemia in a subject are also described. The methods comprise administering to the subject via inhalation an effective amount of hydrogen gas.

For the compositions comprising nitric oxide gas and hydrogen gas, the concentrations of the gases are at least 1 ppm nitric oxide gas and at least 5 ppm hydrogen gas. In a particular embodiment, the composition comprises 1-10000 ppm hydrogen gas and 1-500 ppm nitric oxide gas. In the compositions comprising nitric oxide gas and hydrogen gas, the concentration of the hydrogen gas does not result in the formation of liquid water.

In another aspects, methods of preventing and/or treating methemoglobinemia (for example methemoglobinemia caused by inhaled NO therapy, administration of a nitrite, or administration of nitrate) in a subject is disclosed. The method comprises comprising orally administering to the subject an effective amount of an elemental metal. In certain implementations, the method further comprises orally administering an acid to the subject, wherein the elemental metal and the acid are ingested together. In some aspects, the method comprises orally administering an amount of the elemental metal and the acid effective to generate hydrogen gas in the stomach. Practice of the disclosed method of preventing and/or treating methemoglobinemia reduces $NO_2$-induced toxicity exhibited by the subject, for example, lung and/or airway inflammation, reduced lung function, worsened cough, worsened wheezing, increased asthma attacks, or a greater likelihood of emergency department and hospital admissions. In some aspects, the subject exhibits no $NO_2$-induced toxicity upon oral administration of the elemental metal and/or acid.

DETAILED DESCRIPTION

Figure 1:
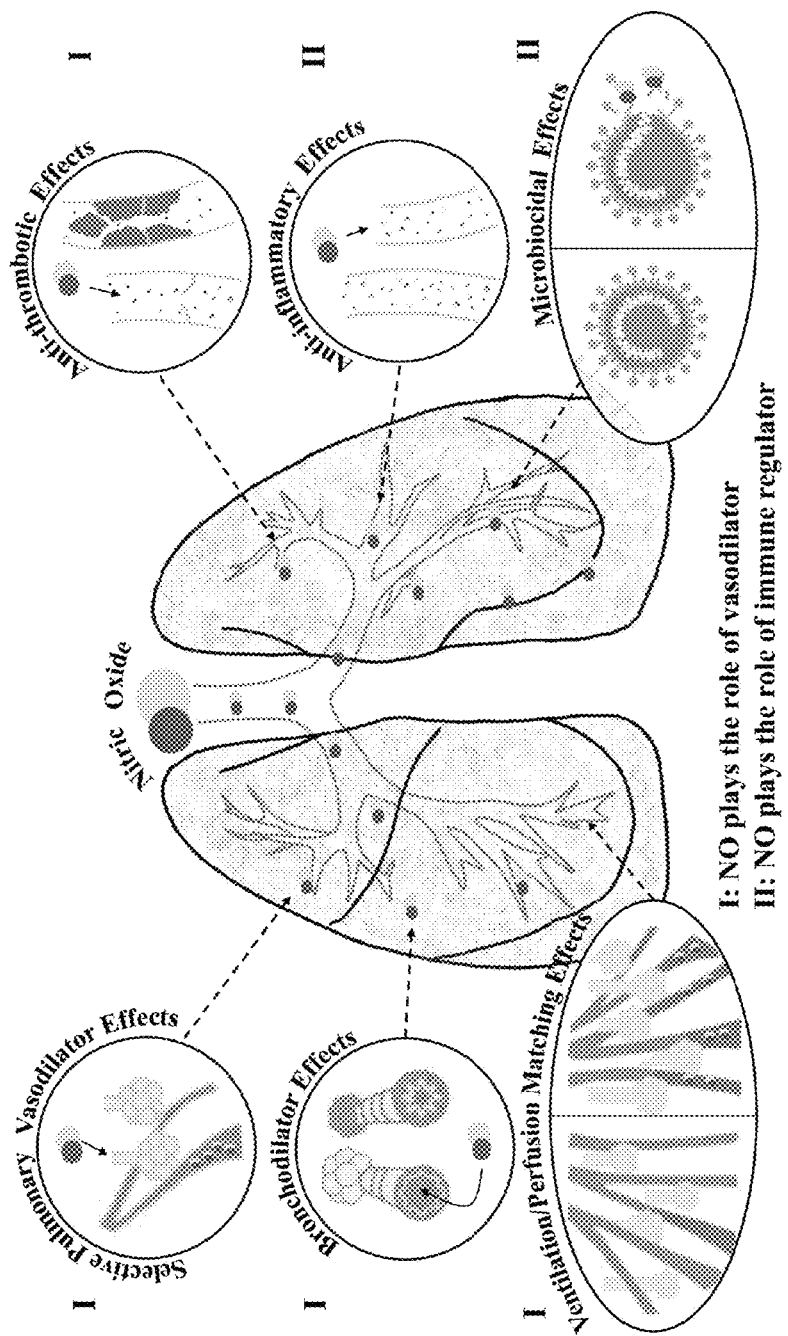
FIG. 1 depicts various pathways in which NO functions in the lungs.

Detailed aspects and applications of the disclosure are described below in the following detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant art, that implementations of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

As used herein, the term "about" refers to a deviation no more than 5% of the given value, for example a deviation of 3%, 2%, 1%, 0.5%, or 0.1% of the given value.

As used herein, the term "acceptable" is a phrase used in its broadest sense and may describe ingredients of a composition that meet Food and Drug Administration (FDA) standards, United States Pharmacopeia (USP) standards, US Department of Agriculture (USDA) standards for food-grade materials, commonly accepted standards of the nutritional supplement industry, industry standards, botanical standards, or standards established by any individual. These standards may delineate acceptable ranges of aspects of ingredients of a composition such as edibility, toxicity, pharmacological effect, or any other aspect of a chemical, composition, or preparation used in implementations of a composition.

As used herein, the term "composition" refers to both a mixture of ingredients or constituents as well as a combination of capsules that contains different ingredients or constituents. Accordingly, in certain embodiments, a composition encompasses separate capsules that are packaged together and are meant to be taken together.

As used herein, the term "elemental metal" refers to the neutral-charged state of a metal element, in other words, a metal in its elemental form and not in a salt form or charged form (exemplary salt forms and charged forms include the oxide, hydroxide, carbonate, chloride, lactate, citrate, aspartate, glycinate, and gluconate of the metal). As such, as used herein, elemental metals and salts of the same metal are different constituents. A description that a composition comprises an elemental metal cannot be satisfied by the presence of a metal salt, and vice versa. For example, a composition that consists of magnesium citrate is not a composition that comprises elemental magnesium in spite of any description that magnesium citrate provides some amount of elemental magnesium. The elemental metals described herein include elemental magnesium, elemental calcium, elemental lithium, elemental zinc, elemental sodium, elemental potassium, elemental beryllium, elemental rubidium, elemental cesium, elemental aluminum, elemental gallium, elemental indium, elemental tin, elemental bismuth, elemental scandium, elemental titanium, elemental vanadium, elemental chromium, elemental manganese, elemental cobalt, elemental manganese, elemental scandium, elemental titanium, nickel, elemental copper, elemental zinc, elemental yttrium, elemental zirconium, elemental niobium, elemental molybdenum, elemental technetium, elemental ruthenium, elemental rhodium, elemental palladium, elemental silver, elemental cadmium, elemental lanthanum, elemental hafnium, elemental tantalum, elemental tungsten, elemental rhenium, elemental osmium, elemental iridium, elemental platinum, elemental gold, elemental manganese, and elemental iron.

As used herein, the term "SpO2 composition" refers to a composition comprising a nitrate and/or a nitrite anion and an elemental metal. In some aspects, the composition is in powder form. Thus, the composition may be referred to as "SpO2 powder."

The present disclosure relates to the discovery that combining in a solution an acid, an elemental metal, and nitrate anion produces inhalable nitric oxide (NO) gas, as verified by a NO sensor. Nitroxyl gas is also formed and may contribute to the surprising therapeutic benefits of the formulation. Nitroxyl formation was confirmed by letting the gas mixture in an airtight chamber with a vial containing nitrosobenzene in ammonia solution, resulting in the formation of cupferron of characteristic light yellow color. It was surprisingly found that the produced NO gas could be administered to subject, for example, via a water pipe, and such administration of NO improved alertness, energy levels, cured headache/migraine, and increased athletic performance as exhibited by increased strength and endurance. Accordingly, disclosed herein are method of administering NO gas to a subject in need thereof.

Surprisingly, the described method of producing NO gas does not result in the production of $NO_2$ gas at concentrations of up to 40 ppm, while at higher NO concentrations the $NO_2$ gas produced is much lower than the amounts described in various studies. Accordingly, in some implementations, the subject in need of NO gas is a subject requiring treatment of a respiratory illness. In certain aspects, the subject exhibits at least one symptom selected from the group consisting of shortness of breath, breathing problems, chest pain, lung inflammation, and decreased oxygen saturation. In some embodiments, the respiratory illness is caused by an infection, for example, an infection by a coronavirus, an influenza virus, respiratory syncytial virus, *Streptococcus pneumoniae, Haemophilus influenzae* type b (Hib), and/or *Pneumocystis jiroveci*. In particular implementations, the subject requiring treatment of a respiratory illness is diagnosed with pneumonia or a severe acute respiratory syndrome caused by a coronavirus, for example an alpha coronavirus selected from 299E and NL63 or a beta coronavirus selected from 0C43, HKU1, MERS-CoV, SARS-CoV, or SARS-CoV-2. In some other aspects, the subject has a condition selected from the group of: Hypoxia after Coronavirus-19 disease (COVID-19), acute respiratory distress syndrome (ARDS), post-ARDS hypoxia, pneumonia, chronic obstructive pulmonary disorder (COPD), mesothelioma, anemia, asthma, interstitial lung disease, pulmonary embolism, collapsed lung, congenital heart defects or disease, pulmonary edema, high altitude sickness, low breathing rate, pulmonary fibrosis, sleep apnea, gastrointestinal infection, *Heliobacter pylori* infection, and a respiratory infection.

In other implementations, the subject in need of NO gas is a subject who would benefit from increased NO levels, for example, a subject seeking to improve athletic performance, to increase energy level or endurance, to improve well-being, and a treatment for migraine.

The methods of administering NO gas to a subject in need thereof comprise combining a source of nitrate anion and/or a source of nitrite anion and an elemental metal in an acidic solution in a vessel capable of housing liquid and gas constituents (for example, a water pipe), wherein NO gas is produced, and administering the NO gas to the subject via the vessel capable of housing liquid and gas constituents. In some aspects, nitroxyl and hydrogen gas are also produced by the reaction. In some implementations the pH of the acid solution is between 0.1 and 6.9. In preferred implementations the pH of the acid solution is between 2 and 4. The subject is administered the NO gas by inhaling the gaseous contents in the water pipe or some other suitable vessel capable of housing liquid and gas constituent that allows for the inhalation of the gas constituents. In certain embodiments, the method comprises combining therapeutically effective amounts of the nitrate anion and a therapeutically effective amount of the elemental metal in the acidic solution in the water pipe, wherein a therapeutically effective amount of NO gas is produced. In some aspects, the therapeutically effective amount of elemental metal and the therapeutically effective amount of the nitrate anion are between 1 mg and 2000 mg and between 30 mg and 4000 mg respectively. In a particular embodiment, the therapeutically effective amounts of the nitrate anion and elemental metal are in a 1:1 molar ratio.

The elemental metal is an alkaline earth metal, an alkali metal, or a transition metal. Because elemental metals are reactive, they are not found in nature. Rather they exist as ores which contain a mixture of various metallic compounds such as salts and oxides. As such, complex extraction and purification utilizing physicochemical methods is required to produce elemental metals. In some embodiments, the elemental metal is elemental magnesium, elemental calcium, elemental lithium, elemental zinc, elemental sodium, elemental potassium, elemental beryllium, elemental rubidium, elemental cesium, elemental aluminum, elemental gallium, elemental indium, elemental tin, elemental bismuth, elemental scandium, elemental titanium, elemental vanadium, elemental chromium, elemental manganese, elemental cobalt, elemental manganese, elemental scandium, elemental titanium, nickel, elemental copper, elemental zinc, elemental yttrium, elemental zirconium, elemental niobium, elemental molybdenum, elemental technetium, elemental ruthenium, elemental rhodium, elemental palladium, elemental silver, elemental cadmium, elemental lanthanum, elemental hafnium, elemental tantalum, elemental tungsten, elemental rhenium, elemental osmium, elemental iridium, elemental platinum, elemental gold, elemental manganese or elemental iron. In some embodiments, the elemental metal is selected from the group consisting of: elemental magnesium, elemental calcium, elemental lithium, elemental zinc, and elemental iron. In some embodiments, the subject is administered a combination of elemental metals. Thus, in some aspects, the composition administered to the subject comprises more than one elemental metal. The elemental metal may be in any form, for example, a powder or granules. Changing the size and the surface area of the elemental metal may be utilized to affect the reaction rate between the metal and the nitrate and acid. It has thus been found that smaller particle sizes of the metal result in a more rapid reaction, producing greater amounts of NO in a smaller amount of time.

In some aspects, the source of nitrate anion ($NO_3^-$) is a nitrate salt of an amino acid or amino acid derivative (for example, creatine nitrate, arginine nitrate, carnitine nitrate, n-acetyl carnitine nitrate, citrulline nitrate, betaine nitrate, and proline nitrate), an inorganic nitrate salt (for example, magnesium nitrate, sodium nitrate, potassium nitrate, calcium nitrate, and lithium nitrate, or their mixed salts, co-crystalline formulation and hydrates), or a natural nitrate source. For natural nitrate sources, the nitrate has been concentrated and/or isolated from a natural source, such as a botanical nitrate source. Examples of natural nitrate sources include, but are not limited to, beet juice, beet juice powder, concentrated beet juice powder, celery powder, spinach and red spinach extract, and Amaranthus extract. In preferred implementations, the nitrate content of natural nitrate sources is standardized so as to provide the sufficient amount of nitrate. In some aspects, the composition comprises more than one source of nitrate anion.

In some aspects, the source of nitrite anion ($NO_2^-$) is a nitrite salt of an amino acid or amino acid derivatives (for example, creatine nitrite, arginine nitrite, carnitine nitrite, n-acetyl carnitine nitrite, citrulline nitrite, betaine nitrite, and proline nitrite), an inorganic nitrite salt (for example, magnesium nitrite, sodium nitrite, potassium nitrite, calcium nitrite, and lithium nitrite, or their mixed salts, co-crystalline formulations and hydrates), or a natural nitrite source. For natural nitrite sources, the nitrite can be concentrated and/or isolated from a natural source, such as a botanical nitrite source.

Figure 4:
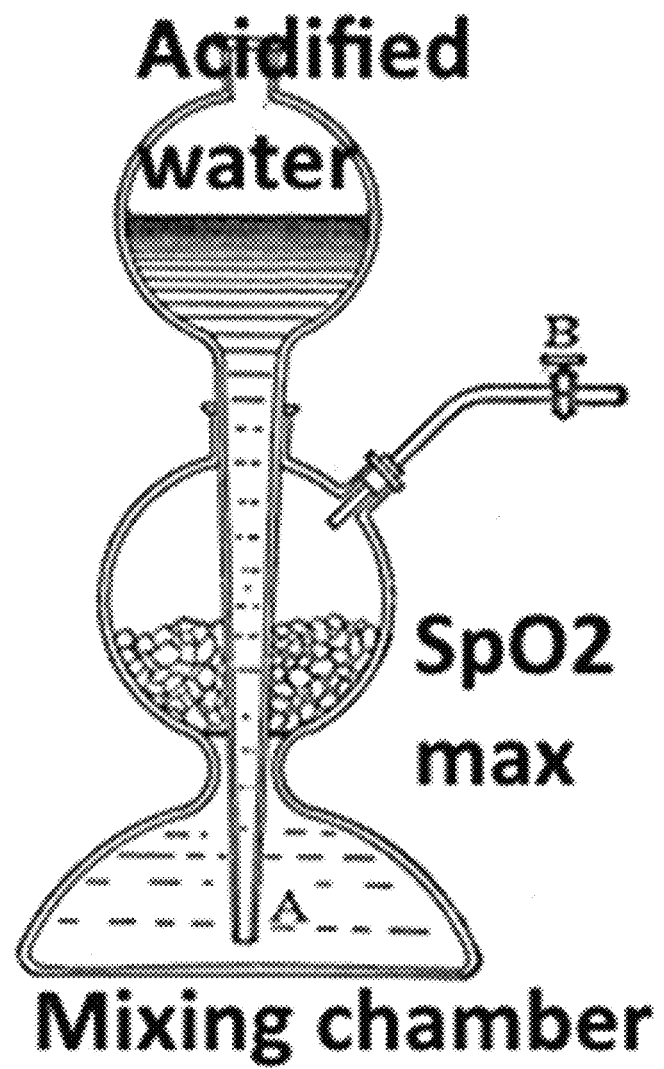
FIG. 4 depicts an exemplary apparatus which can be utilized to cost effectively produce the combination of NO, HNO, and hydrogen gases. The apparatus comprises three compartments, where the top compartment houses a solution of acidified water (preferably acidified with citric acid), the middle compartment houses the $SpO_2$ composition, and the bottom compartment is a mixing chamber, where the acidified water in top compartment would drip into the mixing chamber where it would mix with $SpO_2$ composition also dropping into the mixing chamber from the middle compartment.

In some embodiments, the elemental metal and nitrate and/or nitrite anion are contained in a system for sustained release of NO. For example, the system may be a time-released system (such as a diffusion system, a dissolution system, an osmotic system, and ion-exchange resin), a floating system, a bio-adhesive system, or a matrix system where exposure to the acid or acid solution is controlled. In other implementation either mechanical or electronic methods may be utilized to release the metal and nitrate into the acid solution on a continuous manner to allow for sustained NO gas release. In a particular implementation, the system for sustained release of NO described herein comprises three compartments in fluid connection (see, for example, FIG. 4). The top compartment houses a solution of acidified water (preferable with citric acid), the middle compartment houses the SpO2 composition, and the bottom compartment is a mixing chamber, where the acidified water in the top compartment would drip into the mixing chamber mixing with the SpO2 composition also dropping into the mixing chamber from the middle compartment. The apparatus enables easy adjustment to the amounts of NO, HNO and $H_2$ administered to the patient by controlling the reaction rate of the acidified water and the SpO2 composition. The reaction rate may be controlled by regulating the acidity of the solution, regulating the drip rate of acidified water, regulating the particle size of the SpO2 composition, or regulating the heat in the mixing chamber such as with a heating element that has a built-in thermostat (increasing heat increases the reaction's rate). A similar scheme may be utilized to administer NO/$H_2$/HNO gas in non-ICU patients using a respiratory system, either in home or in a hospital environment, the only difference being that the patient would have to wear a mask or equivalent delivering the gases, instead of an endotracheal tube.

Figure 3:
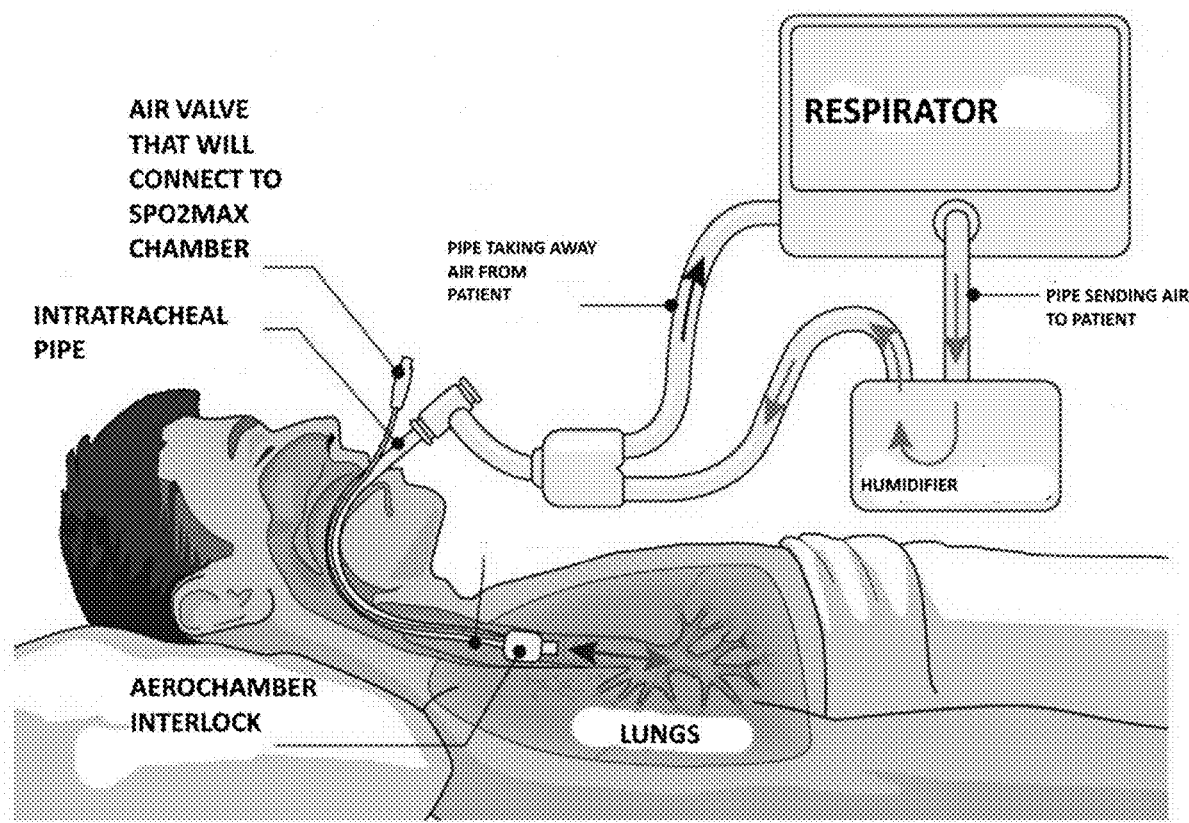
FIG. 3 depicts, in an exemplary implementation, administration of NO and $H_2$ gas to an ICU patient connected to a respirator, wherein the NO and $H_2$ are administered through the air valve inlet, which is typically used to insert nebulized drugs.

In an exemplary implementation, patients connected on a respirator may be administered NO/$H_2$ gas through the air valve inlet that is typically used to insert nebulized drugs. The NO/$H_2$ gas could be produced by the apparatus of FIG. 4. A similar scheme may be utilized to administer NO/$H_2$ gas in non-ICU patients using a respiratory system, either in a home or in a hospital environment, the only difference being that the patient would have to wear a mask, cannula or similar apparatus delivering the gases, instead of an endotracheal tube (see FIG. 3).

Accordingly, a kit for safely administering NO gas to a patient is disclosed herein. The kit comprises a nitrite or nitrate; an elemental metal, wherein the nitrite and/or nitrate and the elemental metal are packaged together; an acid; and instructions for combining the nitrite, the elemental metal, and the acid to generate NO gas without generating $NO_2$ gas and for administering the generated NO gas to a patient. In some embodiments, the kit further comprises a vessel capable of housing liquid and gas constituents, for example, a water pipe. In some aspects, the nitrite or the nitrate in the kit is a salt, for example, a nitrite salt or a nitrate salt. Exemplary salts include sodium nitrite, potassium nitrite, sodium nitrate, potassium nitrate. The elemental metal in the kit is selected from the group consisting of: elemental magnesium, elemental calcium, elemental lithium, elemental zinc, elemental sodium, elemental potassium, elemental beryllium, elemental rubidium, elemental cesium, elemental aluminum, elemental gallium, elemental indium, elemental tin, elemental bismuth, elemental scandium, elemental titanium, elemental vanadium, elemental chromium, elemental manganese, elemental cobalt, elemental manganese, elemental scandium, elemental titanium, nickel, elemental copper, elemental zinc, elemental yttrium, elemental zirconium, elemental niobium, elemental molybdenum, elemental technetium, elemental ruthenium, elemental rhodium, elemental palladium, elemental silver, elemental cadmium, elemental lanthanum, elemental hafnium, elemental tantalum, elemental tungsten, elemental rhenium, elemental osmium, elemental iridium, elemental platinum, elemental gold, elemental manganese and elemental iron.

In some implementations, the method comprises providing the acid in powder form and mixing with the nitrate or nitrite anion and/or the elemental metal before dissolving in a solvent so that NO gas is produced. The acid in powdered formed may be, for example, citric acid, malic acid, or fumaric acid. In preferred embodiments, the solvent used is water, as it is safe, non-toxic and readily available. However other protic and/or polar solvents could be utilized such as ammonia, ethanol, acetic acid and the like. The water or solvent need not be pure and other compounds can be dissolved into it, such as aromas, scents, other medicine and the like. In some embodiments, the acid is a salt of a strong acid with a weak base, which when dissolved in water or some other polar protic solvent, results in the formation of an acidic solution. Thus, the acid may be ammonium chloride, ammonium nitrate, or creatine nitrate. In certain implementations, where the nitrate anion is provided as a nitrate salt formed with weak bases (such as creatine nitrate or proline nitrate), the nitrate salt can serve as the source for both the acid and the nitrate anion.

It will be understood that although the usual sequence of adding the ingredients of the formula is first creating an acid solution and then adding simultaneously the elemental metal and the nitrate, such a sequence is not necessary and there can be variation. For example, the step of combining a nitrate anion and an elemental metal in an acidic solution may comprise simultaneously adding the nitrate, the powdered acid, and the elemental metal in the water or comprise preparing a solution of a nitrate in water and then adding the acid and elemental metal. The critical feature of the disclosed methods is that the elemental metal cannot be allowed to fully react with the acid, which forms salts of the elemental metal and not NO gas. Thus, if one was to add elemental magnesium metal in an acid solution and then after the reaction completed (which would be indicated by dissolution of the magnesium in the liquid in its salt form) add a nitrate, no nitric oxide gas would form.

The methods of generating NO gas for NO inhalation therapy do not generate unsafe levels of $NO_2$ gas, and thus, the gaseous constituents generated do not comprise $NO_2$ gas. For example, the levels of $NO_2$ gas produced by combining the source of nitrite anion and the elemental metal in the acidic solution do not exceed 10 ppm, do not exceed 5 ppm, or do not exceed 2 ppm. In some embodiments, the gas constituents produced by combining the source of nitrite anion and the elemental metal in the acidic solution do not comprise any $NO_2$ gas.

The compositions related to generating NO gas for NO inhalation therapy described herein comprise a nitrite and an elemental metal. In some aspects, the composition comprises an acid. The elemental metal in the composition is selected from the group consisting of: elemental magnesium, elemental calcium, elemental lithium, elemental zinc, elemental sodium, elemental potassium, elemental beryllium, elemental rubidium, elemental cesium, elemental aluminum, elemental gallium, elemental indium, elemental tin, elemental bismuth, elemental scandium, elemental titanium, elemental vanadium, elemental chromium, elemental manganese, elemental cobalt, elemental manganese, elemental scandium, elemental titanium, nickel, elemental copper, elemental zinc, elemental yttrium, elemental zirconium, elemental niobium, elemental molybdenum, elemental technetium, elemental ruthenium, elemental rhodium, elemental palladium, elemental silver, elemental cadmium, elemental lanthanum, elemental hafnium, elemental tantalum, elemental tungsten, elemental rhenium, elemental osmium, elemental iridium, elemental platinum, elemental gold, elemental manganese and elemental iron. In some aspects, the nitrite in the composition is a nitrite salt, for example, sodium nitrite or potassium nitrite. In other aspects, the nitrite in the composition is a botanical source of nitrite standardized for nitrite content, for example, beetroot powder.

In some aspects, the composition is in the form of a capsule, a cachet, a pill, a tablet, a powder, a granule, a pellet, a bead, a particle, a troche, a lozenge, a pastille, a solution, an elixir, a syrup, a tincture, a suspension, an emulsion, a mouthwash, a spray, a drop, an ointment, a cream, a gel, a paste, a transdermal patch, a suppository, a pessary, cream, a gel, a paste, a foam, and combinations thereof. The composition may further comprise an acceptable additive and/or an acceptable carrier. The acceptable additive may be selected from at least one member from the group consisting of: a solubilizer, an enzyme inhibiting agent, an anticoagulant, an antifoaming agent, an antioxidant, a coloring agent, a coolant, a cryoprotectant, a hydrogen bonding agent, a flavoring agent, a plasticizer, a preservative, a sweetener, and a thickener. The acceptable carrier may be selected from at least one member from the group consisting of: an excipient, a lubricant, a binder, a disintegrator, a diluent, an extender, a solvent, a suspending agent, a dissolution aid, an isotonization agent, a buffering agent, a soothing agent, and an amphipathic lipid delivery system.

In some aspects, the composition is in a form suitable for oral administration. In other aspects, the composition is in a form suitable for inhalation of the gases produced when in contact with an acidified solvent.

In some aspects, the composition comprises an effective amount of nitrite to produce a therapeutic effect and an effective amount of elemental metal to prevent or reduce nitrite toxicity. The therapeutic effect of the nitrite may be reducing blood pressure or treating and/or alleviating symptoms of a respiratory illness. The respiratory illness may be an infection by a coronavirus, an influenza virus, respiratory syncytial virus, Streptococcus pneumoniae, Haemophilus influenzae type b, Pneumocystis jiroveci, a fungus, or a protozoa. In certain embodiments of the therapeutic composition, the effective amount of nitrite is 1-1000 mg and the effective amount of elemental metal is 1-10000 mg. In other embodiments, the effective amount of nitrite is 5-200 mg and the effective amount of elemental metal is 5-1000 mg. In a particular embodiment of the therapeutic composition, the effective amount of nitrite is 30-100 mg and the effective amount of elemental metal is 10-400 mg.

In a particular embodiment of the therapeutic composition, the nitrite is packaged in a capsule, a cachet, a pill, a tablet, a powder, a granule, a pellet, a bead, a particle, a troche, or a pastille; and the elemental metal is packaged in a capsule, a cachet, a pill, a tablet, a powder, a granule, a pellet, a bead, a particle, a troche, or a pastille. In another embodiment, the nitrite is packaged in a capsule, a cachet, a pill, a tablet, a powder, a granule, a pellet, a bead, a particle, a troche, or a pastille; the elemental metal is packaged in a capsule, a cachet, a pill, a tablet, a powder, a granule, a pellet, a bead, a particle, a troche, or a pastille; and the acid is packaged separately from the nitrite and the elemental metal. In some aspects, the nitrite, the elemental metal, and the acid are in solid forms. In a particular embodiment, the nitrite and the elemental metal are packaged together, for example, in one capsule, one cachet, one pill, or one tablet.

Methemoglobinemia, a condition that could be monitored by a drop in SpO2 levels, is a side effect associated with inhaled NO therapy (Raut and Maheshwari, "Inhaled nitric oxide, methemoglobinemia, and route of delivery." *Saudi J Anaesth.* 2017, 11(3):364). It was surprisingly found that administration of the NO gas according to the method described herein in did not result in the development of methemoglobinemia. The mechanism for why methemoglobinemia was not caused by the disclosed method remains in research, but the hydrogen gas product of the reaction of the nitrate anion and elemental metal in the acidic solution may have a protective effect. It should be noted that if prevention and treatment of methemoglobinemia is the result of using this method, some elemental metals can produce hydrogen by reacting with bases, for example, aluminum: $2Al+2NaOH+2H_2O \rightarrow 2NaAlO_2+3H$. One could have for the purposes of the invention NO gas created by reaction of nitrite with an acid in one beaker and generation of $H_2$ gas by reaction of a metal that produces hydrogen in contact with bases, such as aluminum.

During the development of this invention the main inventor found himself exposed multiple times to NO levels higher than 25 ppm over long periods of time (measured with a BW BWS-N-Y yellow housing, Solo nitric oxide (NO) gas detector) and observed no ill effects. In fact, his oxygenation levels as measured by $SpO_2$ oximeter were always in the 97-100 range. Accordingly, also disclosed herein are methods of preventing the onset of methemoglobinemia from nitrate, nitrite, or NO exposure, wherein the method comprises administering hydrogen to the subject exposed to a source of nitrate, a source of nitrite, or NO.

In some aspects, the methods of administering inhaled nitric oxide gas with reduced toxicity to a subject are described. In some aspects, the reduced toxicity manifests as reduced lung injury compared to the amount of lung injury that would occur by administration of NO gas by itself at the same concentration. In other aspects, the reduced toxicity manifests as the subject's blood methemoglobin level not exceeding 2%. In other aspects, methods of reducing inhaled NO toxicity comprising inhaling NO with an effective amount of hydrogen to reduce NO toxicity (for example, lung tissue damage, an increase in nitrotyrosine levels at the tissues exposed to NO, and development of methemoglobinemia) are described. The methods comprise administering to a subject nitric oxide gas and administering to the subject hydrogen gas. In certain implementations, the methods further comprise administering to the subject nitroxyl gas. In some aspects, methods of therapeutically administering inhaled NO gas are described that comprise co-administering an effective amount of hydrogen gas with NO gas to a subject. The effective amount of hydrogen is an amount sufficient to reduce or prevent the formation of $NO_2$ during administration of NO gas to the subject. In some aspects, the effective amount of hydrogen gas is at least 1000 ppm. In certain implementations, the method comprises mixing an elemental metal with a nitrate and/or nitrite in an acidified solvent, whereby NO gas and the effective amount of hydrogen gas are produced and administered to the subject via inhalation.

A composition comprising nitric oxide gas and hydrogen gas is also described. The concentrations of the gases in the composition are at least 1 ppm nitric oxide gas and at least 5 ppm hydrogen gas. In a particular embodiment, the composition comprises 1-10000 ppm hydrogen gas and 1-500 ppm nitric oxide gas. In the compositions comprising nitric oxide gas and hydrogen gas, the concentration of the hydrogen gas does not result in the formation of liquid water.

EXAMPLES

Example 1

In a 1000 ml beaker, an acid solution was produced by dissolving 5 grams of citric acid in 100 ml of warm water. Elemental magnesium (200 mg) and potassium nitrate (1000 mg of) were simultaneously added to the acid solution. A FeNO by Niox machine, which can measure ambient NO levels, was used to tested whether NO gas formed from the addition of elemental magnesium and potassium nitrate into the acid solution. The room's NO levels before the experiment were 0. Soon after the addition of elemental magnesium and potassium nitrate into the acid solution, the machine recorded 200 ppb NO. More NO may have been generated, as 200 bbp is the machine's limit of detection.

Example 2

1000 mg of citric acid was mixed in a beaker bong containing warm water to produce an acid solution. 200 mg of elemental magnesium and 1000 mg of potassium nitrate from a prefilled capsule was emptied into the bong containing the acid solution. A 58-year-old male subject suffering with migraine inhaled the produced gas via the beaker bong. The subject reported that his headache stopped and could breathe easier. He also reported his energy and concentration levels increased.

Example 3

In comparison of time to exhaustion on an exercise bike, a 39-year-old subject reported his time to exhaustion on the exercise bike on its hardest setting increase by 5 minutes after inhaling gas produced in a beaker bong according to the same method described in Example 2. On a separate occasion, the subject reported that the maximum amount of push up performed increase by 10 when he inhaled the NO gas produced by mixing elemental magnesium and potassium nitrate (maximum number of pushups increased from 50 to 60).

Example 4

To confirm that hydrogen gas is a byproduct of the combining the elemental metal with an acid, a teaspoon of elemental magnesium powder was added to a vial containing 100 ml of water saturated with citric acid. The air on top of the vial was flammable.

Example 5

Sodium nitrite is known to be poisonous at high amounts. Because of its toxicity, its utilization as a NO source in therapeutics is limited only to an antidote used for cyanide poisoning. The lowest calculated lethal dose is 2.6 grams (Katabami et al., "Severe Methemoglobinemia due to Sodium Nitrite Poisoning", *Case Reports in Emergency Medicine,* 2016, Article ID 9013816), but there have been reported cases of severe methemoglobinemia with much lower doses. Administration of 600 mg to an adult for the treatment of cyanide toxicity resulted in a methemoglobin level of 58% (van Heijst et al., "Therapeutic Problems in Cyanide Poisoning," *Journal of Toxicology: Clinical Toxicology,* 1987, 25(5): 383-398). Moderate-to-severe poisoning is associated with cyanosis (blueness of the skin), confusion, loss of consciousness, seizures, abnormal heart rhythms, and death. Due to the lack of observed cases of methemoglobinemia for subjects ingesting a combination of elemental metal and a source of nitrate or inhaling the gas produced by the combination in an acidic solution, it was hypothesized that the exposure to hydrogen gas and/or zinc/magnesium ions could prevent the development of methemoglobinemia. Methemoglobinemia can be monitored both directly by time consuming blood tests and indirectly by SpO2 measurements. Since methemoglobin cannot carry $O_2$, higher methemoglobin levels result in lower oxygen saturation levels.

One of the inventors, having fasted overnight, ingested a capsule containing 310 mg of $NaNO_2$ and one capsule containing 1000 mg citric acid with the intention inducing methemoglobinemia, while the other inventor monitor the conditions of the test subject inventor. After the first 15 minutes, the test subject inventor started experiencing unwanted side effects including gastrointestinal distress, dizziness, brain fog, confusion, difficulty in breathing, migraine, abnormal heart palpitations, tachycardia with a peak of 240 pulses/minute, and low SpO2 levels with a lowest reading of 91 at about 25 minutes into the experiment. Table 1 summarizes the test subject inventor's SpO2 levels and heart rate over the course of the experiment. SpO2 levels and heart rate readings were videotaped, and they can be found in the chart below:

TABLE 1

|  | Time | SpO2 ave. | HR |
|---|---|---|---|
|  | 11:45 AM | 98 |  |
| Take 310 mg sodium nitrite and 1000 mg citric acid capsules | 11:50 AM | 98 | 181 |
|  | 11:55 AM | 98 | 221 |
|  | 12:00 PM | 96 | 240 |
|  | 12:05 PM | 95 | 121 |
|  | 12:08 PM | 91.5 | 117 |
|  | 12:10 PM | 94 | 225 |
|  | 12:15 PM | 94 | 125 |
|  | 12:20 PM | 93 | 215 |
|  | 12:25 PM | 94 | 128 |
|  | 12:30 PM | 93 | 139 |
|  | 12:35 PM | 93 | 133 |
|  | 12:40 PM | 92 | 229 |
|  | 12:45 PM | 95 | 108 |
|  | 12:50 PM | 94 | 114 |
|  | 12:55 PM | 95 | 92 |
|  | 1:00 PM | 95 | 161 |
|  | 1:05 PM | 95 | 122 |
|  | 1:10 PM | 94 | 132 |
|  | 1:15 PM | 95 | 84 |
|  | 1:20 PM | 95 | 152 |
|  | 1:25 PM | 96 | 122 |
| Take 1000 mg citric acid and elemental magnesium | 1:30 PM |  |  |
|  | 1:35 PM | 96 | 92 |
|  | 1:40 PM | 97 | 106 |

After a 48-hour washout period, the test subject inventor prepared 3 capsules each containing 1000 mg elemental magnesium powder and 3 other capsules each containing 1000 mg citric acid. Elemental magnesium powder reacts violently with the acids in a very exothermic reaction. Thus, it was unknown if the ingestion of such large quantities of elemental magnesium would be safe or even tolerable and if their reaction with a toxic dose of nitrite would be tolerable. Regardless, the test subject inventor co-ingested a capsule containing 310 mg sodium nitrite and 1000 mg elemental magnesium with 2 capsules containing 1000 mg citric acid in each capsule (because some of the acid would be consumed by the elemental magnesium, the amount of citric acid was doubled compared to the initial dose of the first experiment). After 30 minutes and after 60 minutes, the test subject inventor ingested another 1000 mg elemental magnesium and 1000 mg citric acid in capsule form. The inventor experienced none of the unwanted side effects of the first experiment. The only side effect noticed was lightheadedness, which he had experienced many times in the past which is associated with low blood pressure. His SpO2 levels remained elevated compared to the first experiment, never falling below the threshold level of 95%. Table 2 summarizes the test subject inventor's SpO2 levels and heart rate over the course of the second experiment.

TABLE 2

|  | Time | SpO2 | HR |
|---|---|---|---|
| Take 1× (310 mg sodium nitrite and 100 mg elemental magnesium) and 2× (1000 mg citric acid) | 11:00 AM | 100 | 105 |
|  | 11:05 AM | 99 | 103 |
|  | 11:10 AM | 97 | 112 |
|  | 11:15 AM | 97 | 161 |
|  | 11:20 AM | 96 | 133 |
|  | 11:25 AM | 96 | 214 |
|  | 11:30 AM | 95 | 117 |

TABLE 2-continued

| | Time | SpO2 | HR |
|---|---|---|---|
| Take 1× (310 mg sodium nitrite and 100 mg elemental magnesium) and 2× (1000 mg citric acid) | 11:31 AM | | |
| | 11:35 AM | 95 | 120 |
| | 11:40 AM | 96 | 135 |
| | 11:45 AM | 95 | 181 |
| | 11:50 AM | 97 | 135 |
| | 11:55 AM | 95 | 121 |
| | 12:00 PM | 95 | 137 |
| Take 1000 mg citric acid and elemental magnesium | 12:02 PM | | |
| | 12:07 PM | 95 | 99 |
| | 12:14 PM | 95 | |
| | 12:21 PM | 95 | 201 |

The test subject inventor felt completely fine 90 minutes after the experiment. His SpO2 level was in the area of 95%-97%.

Example 6

Nitrogen dioxide is an orange-colored, smelly gas that can be formed from highly concentrated nitric acid reacting with air (concentrated $HNO_3$ constantly exhumes orange-colored $NO_2$ in the open air and thus is referred to as "red fuming nitric acid") and oxidation of nitric oxide (NO) by oxygen in the atmosphere (Holleman and Wiberg, Inorganic Chemistry. Academic Press: San Diego, 2001). When nitrogen is released during fuel combustion, it combines with oxygen atoms to create NO. NO is further combined with oxygen to create nitrogen dioxide ($NO_2$). NO is not considered to be hazardous to health at typical ambient concentrations, but nitrogen dioxide can be hazardous. $NO_2$ is also formed by decomposition of nitrites in acidic solution. When using strongly acidified sodium nitrite, it can be converted to nitrous acid. Nitrous acid is very unstable, easily decomposing into $NO_2$, NO (which can further react with oxygen in the air to become $NO_2$), and water. For this reason, inhalation of the gas products from the reaction of nitrite with acid in solution is generally considered unsafe due to the $NO_2$ levels produced. $NO_2$ is a major problem in the utilization of NO gas in therapeutics. Although the current NO tanks contain typically 0.1% NO gas in inert nitrogen gas, $NO_2$ is still a major issue in utilization of NO gas as a therapeutic method.

Figure 2:
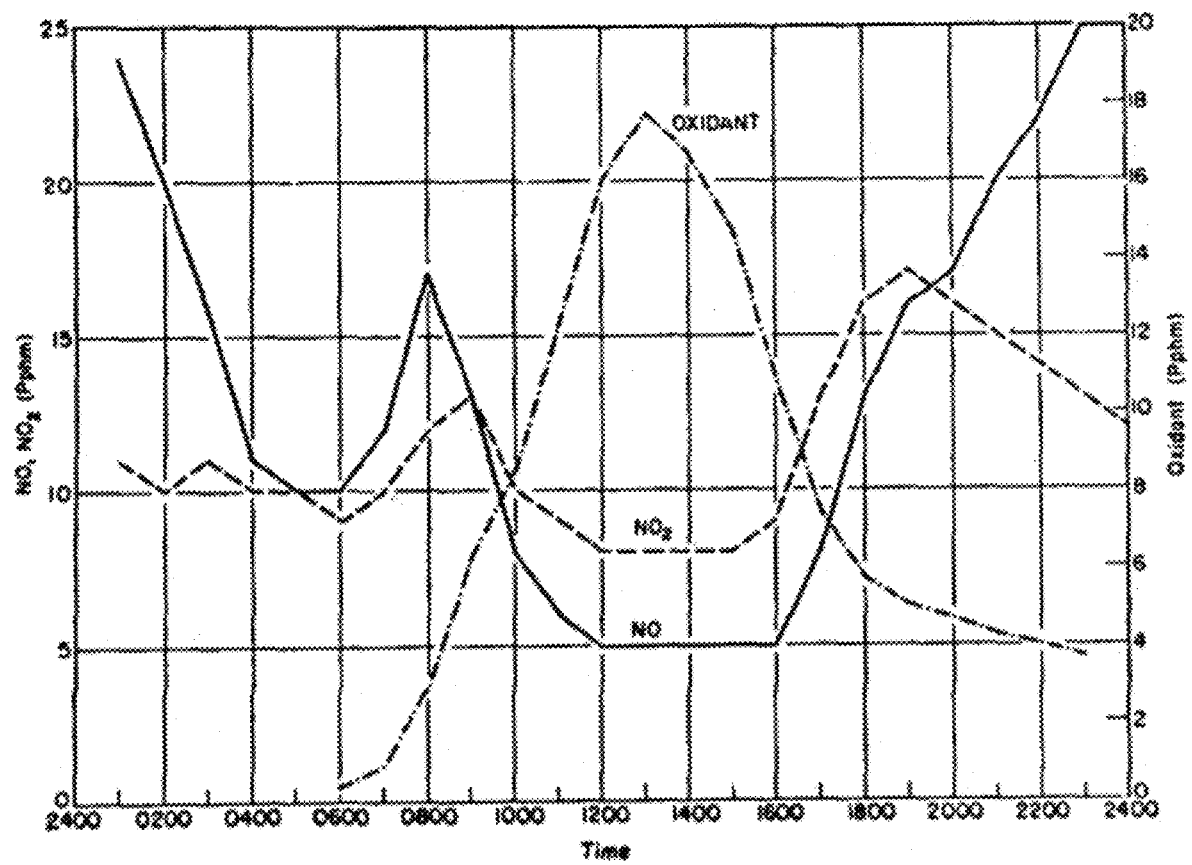
FIG. 2 depicts a quantitative analysis of nitric oxide in the presence of nitrogen dioxide at atmospheric concentrations.

Administration of inhaled nitric oxide (NO) with the existing compressed gas delivery systems is associated with unavoidable codelivery of nitrogen dioxide ($NO_2$). In average atmospheric conditions, $NO_2$ concentrations predominates NO concentrations (Levaggi, et al., "Quantitative analysis of nitric oxide in presence of nitrogen dioxide at atmospheric concentrations," Environ. Sci. Technol., 1974, 8(4): 348-350) (see FIG. 2).

The equilibrium would be expected to be much higher in atmospheres with higher oxygen saturation than the atmosphere, such as a person given 100% oxygen treatment.

Totapally et. al. demonstrated in a mechanical ventilator model designed to mimic NO delivery in humans that $NO_2$ has increased highly toxic concentrations of 19.4 ppm by the time the NO reaches lungs. Meanwhile, $NO_2$ levels continued to increase while NO concentrations dropped so that the total concentration of $NO+NO_2$ remained the same.

The concentration of NO decreased significantly (P<0.001) from the proximal port (site 11 of the inspiratory circuit (86.16+/-0.38 ppm) through the lung bellows (site 4) (70.08+/-0.23 ppm). The concentration of $NO_2$ increased significantly (P<0.001) from site 1 (3.25+/-0.04 ppm) through site 4 (19.4+/-0.19 ppm) . . . $NO_2$ concentrations in the lung were significantly increased above commonly accepted toxic concentrations during ventilation with high concentrations of NO (80 ppm) and high fractional concentrations of oxygen. (emphasis added)

(Totapally et al., "Nitric oxide and nitrogen dioxide concentrations during in vitro high-frequency oscillatory ventilation," J Crit Care. 1999, 14(3):141-149).

Even at the proximal port (what would count as a person's nose or throat) the $NO_2$ levels were already well above what is considered safe/acceptable (less than 2 ppm, per US Environmental Protection Agency's air quality criteria for oxides of nitrogen, EPA Report No. EPA/600/8-91/049aF-cF). The majority of biochemical studies show that acute or subchronic exposure to high levels of nitrogen dioxide exceeding 3160 $\mu g/m^3$ (2 ppm) cause deleterious effects, and this is the current maximum acceptable recommended WHO level. For people with airway disease, such as asthma, COVID-19, pneumonia, COPD and such, the need for as little $NO_2$ levels during NO therapy as possible is a must.

Experiment

In a 700 ml glass, 500 ml of room temperature (about 20° C.) water was added. A BW BWS-D-Y yellow housing, Solo Nitrogen dioxide ($NO_2$) gas detector, non-wireless, was clipped on the rim of the glass so that the sensor would be as close to the surface of the water as possible without touching the water. 3000 mg of citric acid were dissolved in the water to simulate the acidic condition of the stomach, though for the purposes of producing "clean" NO gas they could be substituted with any other suitable acidifying substance. A capsule of SpO2max (1200 mg KNO3, 200 mg elemental magnesium, 50 mg elemental zinc) was dissolved in the solution and the whole process was videotaped. The reaction instantly produces NO in therapeutic concentrations (>20 ppm) and procures beneficial effects to patients and healthy people alike. For the first about 10 minutes of the reaction, no $NO_2$ was emitted. During the next 20 minutes, small emissions of $NO_2$ (less than 2 ppm, in particular less than 1.7 ppm) would occur. Thus, it would be possible to administer NO with no $NO_2$ present by administering the products of the reaction for the first 10 minutes of the reaction and then remaking the reaction mixture if more NO needs to be administered. It is of course possible that different reactant rates and/or reactants could produce "clean" NO gas without any $NO_2$ gas for a more prolonged time, possibilities that the applicant intends to explore in full. Thus, the described method of administering NO is an easier, healthier, cheaper, and safer method than the current NO gas delivery.

Example 7

During the course of developing the described methods for producing NO for a more affordable, effective and safe source of NO therapy, one of the inventors accidentally exposed himself both chronically and acutely to NO gas. One day after exposing himself to a high amount of ambient NO (ambient NO>80 ppm), he started experiencing symptoms of methemoglobinemia and had lung inflammation, as exhibited by SpO2 of 85%, dizziness, pain in the lungs and weakness. Since onset of symptoms, the inventor inhaled $H_2$ gas, produced by reacting elemental magnesium and citric acid in a glass of water. He also ingested 2000 mg elemental magnesium powder with water, which would generate $H_2$ gas in reaction with the HCl in his stomach.

His condition and SpO2 worsened throughout the day, and later that night he was admitted at the ER with a recorded SpO2 of 45%. The hospital verified that the inventor developed NO-induced lung inflammation by X-rays and a CAT scan. Upon the diagnosis, blood samples were taken from the inventor to measure methemoglobin levels. To the surprise of the medical staff, no methemoglobin was detected even while the inventor had an SpO2 of 45%. A normal methemoglobin fraction is about 1%. During the transfer, he also never exhibited cyanosis (blue skin), which is associated with a person having 3-15% methemoglobin. Accordingly, no methemoglobin treatment (i.v. methylene blue) was administered to the inventor.

Thus, hydrogen inhalation and ingestion (via the form of an elemental metal, in this case magnesium) treated and/or alleviated NO-induced methemoglobinemia. However the existence of fluid in the lungs of the inventor cautions that the H2 administered must be in concentrations that will not form liquid water in the lung.

Example 8

A flask containing 100 ml 0.1M HCl was put into a Bel-Art Secador Polystyrene Mini Desiccator Cabinet (0.31 ft$^3$). The contents of one capsule containing 1200 mg $KNO_3$, 200 mg elemental magnesium, and 50 mg elemental zinc and the contents of a second capsule containing 1000 mg citric acid were added to the flask. An NO sensor was placed into the desiccator cabinet. In 10 minutes, NO levels rose from 0 ppm to 6.4 ppm. Thus, theoretically, with the average stomach having a size of one liter, the amount of NO in the stomach from ingesting the two capsules would be 56 ppm.

Notably, adding 1 teaspoon of $KNO_3$ to 50 ml 25% HCl did not result in any measurable amount of NO gas.

Example 9

A 100 ml vial containing 100 mg of NaNO3 and 50 mg of elemental magnesium was put into a Bel-Art Secador Polystyrene Mini Desiccator Cabinet (0.31 ft$^3$). A Honeywell NO and a Honeywell $NO_2$ detector were turned on and also placed into the desiccator cabinet. The vial was filled with 0.1N HCl, and the container rapidly sealed. Within three minutes, the concentration of NO gas had exceeded the therapeutic levels of 20 ppm. No $NO_2$ was detected.

Five minutes after the placement of the hydrochloric acid, NO levels reached levels of 31.4 ppm while $NO_2$ levels remained below the levels recognized to cause deleterious biological effects of 2 ppm.

Example 10

A Honeywell NO and a Honeywell $NO_2$ detectors were put into a Bel-Art Secador Polystyrene Mini Desiccator Cabinet (0.31 ft$^3$) along with a vial. A gelatin capsule containing 1000 mg citric acid and a gelatin capsule containing 1200 mg $KNO_3$, 200 mg elemental (metallic) magnesium and 50 mg elemental (metallic) zinc were added in the vial. The door of the desiccator cabinet was quickly shut after adding 100 ml of 0.1N HCl (which simulates the acid conditions of the stomach) into the vial. The levels of NO rose to a concentration of 10.6 ppm in the span of 40 minutes, which was when a single ppm of $NO_2$ was formed. Thus, the surprising effects of this oral formulation in the treatment of respiratory illnesses is not only due to formation of NO but also due to lack of conversion of NO to $NO_2$.

Example 11

To further study the mechanisms behind the unexpected results of Examples 9 and 10, a hydrogen sensor and an oxygen sensor were also placed into the desiccator cabinet alongside the NO and $NO_2$ sensors in the same conditions (same reactants) as in Example 10.

During the reaction $H_2$ levels rose rapidly. A rise in $H_2$ level was detected three minutes after the HCl was added to the flask, which was before the rise of NO level. About 20 minutes after the start of the reaction, $H_2$ concentration reached the sensor's maximum capacity of 1000 ppm. About 50 minutes after the start of the reaction, NO concentration reached 15 ppm and $NO_2$ concentration 2 ppm.

Surprisingly, no loss of oxygen was monitored by the oxygen sensor. In previous experiments, the inventors found that excessive inhaling of $H_2$ gas could lead to reduction of SpO2, which might have been from the formation water in the lungs by reaction of atmospheric oxygen with hydrogen. The assumption that hydrogen in high concentrations could react with atmospheric oxygen and form water in the lungs was confirmed with a later experiment, where adding 10 grams elemental magnesium in 500 ml water in a vial placed in the desiccator cabinet resulted in a drop in $O_2$ levels that coincided with an increase in humidity levels as measured by the hydrometer increased. In fact, clear drops of water could be seen on the walls of desiccator cabinet.

In view of the results of the present application, exposure to 1000 ppm of $H_2$ is presumed to be safe, but further experimentation will be required with to explore the safest and most effective ratios of NO, nitrogen gas, and hydrogen gas.

Example 12

To further elucidate the connection between NO, $NO_2$ and $H_2$ and their utilization to treat patients with inhaled or ingested NO producing formulations, three experiments were conducted.

For the first experiment, a 100 ml vial containing 200 mg elemental (metallic) magnesium in 100 ml 0.1N HCl was placed in the same cabinet as used in Examples 9-11 along with the NO, $NO_2$ and $H_2$ sensors used in these examples, and the door of the cabinet quickly closed. The level of $H_2$ rose rapidly to exceed 1000 ppm. The levels of NO and $NO_2$ remained zero for the one hour of recording that took place after placement of the vial into the desiccator cabinet.

For the second experiment, a 100 ml vial containing 100 mg of $NaNO_2$ and 100 ml of 0.1N HCl was placed in the same cabinet as used in Examples 9-11 along with the NO, $NO_2$ and $H_2$ sensors. Levels of NO and $NO_2$ started rising rapidly, with the $NO_2$ level exceeding 2 ppm and the NO levels exceeding 4.2 ppm two minutes later. $H_2$ level remained at 0 ppm.

At three minutes after the reaction started, the $NO_2$ level exceeded the safety limits of 5 ppm, while the NO level rose to 13 ppm. The $H_2$ level still remained at 0 ppm. At 30 minutes after the reaction, the $NO_2$ level reached 58 ppm, which is a level high enough to theoretically kill a person with just a few minutes of inhaled exposure. The NO level was almost equal to $NO_2$ levels at about 58 ppm. Interestingly, the $H_2$ level rose to 112 ppm. The mechanism of the reaction of hydrogen production is unknown (presumably by partial evaporation of the HCL gas), but this concentration of $H_2$ is not high enough to affect a person and its presence had no positive effect of reducing the $NO/NO_2$ ratio.

For the third experiment, two 100 ml vials were placed in the same cabinet as used in Examples 9-11 along with the NO, $NO_2$ and $H_2$ sensors used in these examples. One vial contained 200 mg elemental (metallic) magnesium in 100 ml 0.1N HCl, which has been shown to quickly produce $H_2$ at levels exceeding 1000 ppm. The other vial contained 100 mg of $NaNO_2$ in 100 ml 0.1N HCl. Through the 30 minutes recording, the $NO/NO_2$ ratio remained roughly at 2:1. At thirty minutes after the start of the reaction, the NO level was 44 ppm NO and the $NO_2$ level was 22 ppm $NO_2$. The $H_2$ level, as in experiments before, rapidly rose to 1000 ppm, which was the sensor's limit of detection and remained at that level through the 30-minute period of recording. Thus, co-existence of hydrogen gas with NO reduces the formation of $NO_2$ and can improve NO inhalation safety and effectiveness.

Example 13

A pair of lamb lungs was obtained from Carolina Chemicals. Each lung was inserted in a Bel-Art Secador Polystyrene Mini Desiccator Cabinet (0.31 ft³) for a study on the effect of exposure to NO based how the gas is produced. For one lung, NO and its byproduct Nitrogen Dioxide were produced in the chamber by mixing 200 mg of sodium nitrite in 100 ml water containing 1 gram of citric acid. The lung was left exposed to the gases for 4 hours. The lung was sliced and examined under a microscope, where notable histopathological damage (melting of the wall of alveolae) and alteration in tissue color could be observed. The experiment was repeated on the second lung, but this time with exposure to NO being generated via mixing 200 mg elemental magnesium, 50 mg elemental zinc, 1200 mg $KNO_3$ and 1000 mg citric acid in 100 ml of water. After 2 hours, the lung was taken out, sliced, and examined under a microscope for any histopathological damage or changes in tissue color. No histopathological damage to the lung or change in the tissue color was observed.

Example 14

The size of elemental magnesium impacts the effectiveness, safety, and side effects profile of the compositions administered.

Multiple iterations of the composition with differing mesh sizes of the elemental metal were prepared and tested in subjects to determine whether the mesh size of the elemental metal would affect the benefits and/or side effects that a subject would experience upon ingestion. Table 3 lists the formulations tested.

TABLE 3

Formulations of elemental metal evaluated in studies.

| Composition | Metal (amount in mg) | Size | Other Ingredients (amount in mg) |
|---|---|---|---|
| 1 | Mg (200 mg) | Mg beads - 5 mm in diameter | $KNO_3$ (1200 mg), citric acid (1000 mg) |
| 2 | Mg (200 mg) | Mg granules - 35 mesh | $KNO_3$ (1200 mg), citric acid (1000 mg) |
| 3 | Mg (100 mg) | Mg powder - 60-200 mesh | $KNO_3$ (310 mg), citric acid (1000 mg) |
| 4 | Mg (100 mg) | Mg dust -325 mesh | KNO3(310 mg), citric acid (1000 mg) |

The different formulations demonstrated varying effectiveness in alleviating respiratory illnesses. In some cases, the subjects experienced side effects including gastrointestinal disturbances, diarrhea, nausea, and vomiting. Adverse effects were much more common with the magnesium dust formulation than with the other formulations.

Example 15

Various forms of elemental magnesium are capable of generating $H_2$, NO, and $NO_2$ gases with potassium nitrate.

Three forms (and sizes) of elemental magnesium at 200 mg amount were used to compare the generation of $H_2$, NO, and $NO_2$ gas produced after mixing with 1200 mg $KNO_3$ and 1000 mg citric acid powder upon the addition of 100 ml water. Immediately after adding 100 ml distilled water at room temperature, the beaker containing the magnesium was placed in a Bel-Art Secador Polystyrene Mini Desiccator Cabinet (0.31 ft³). At the beginning of the experiment with magnesium powder, granular magnesium, and magnesium beads, the sensors for $H_2$, NO, and $NO_2$ were all zero.

About 90 seconds after the addition of water to the beaker with magnesium powder (60-200 mesh size) and 1200 mg $KNO_3$ and 1000 mg citric acid powder, the concentration of NO gas was 12.8 ppm, $NO_2$ gas was 0 ppm, and $H_2$ gas was 142 ppm. As the experiment continued, the concentration of NO and $H_2$ gases continued to rise. At 2 minutes after the water was added to the powder, the concentration of NO gas was 39.2 ppm, $H_2$ gas was 435 ppm, and $NO_2$ gas was at 0 ppm. This ratio of NO to $NO_2$ is surprising. It was previously unheard of to reach nearly 40 ppm NO gas with zero $NO_2$. At 5 minutes after the water was added to the powder, NO gas reached 49 ppm, while the $NO_2$ gas increased to 3.0 ppm. Hydrogen gas increased to over 1000 ppm (maximum detectable range of the sensor).

In the experiment with granular magnesium (~35 mesh size) and 1200 mg $KNO_3$ and 1000 mg citric acid powder, the concentrations of NO gas, $H_2$ gas, and $NO_2$ gas at 1 minute after the addition of water were 3.8 ppm, 66 ppm, and 0 ppm, respectively. At 5 minutes after the addition of water, the sensor reading was 11.4 ppm for NO gas, 186 ppm for $H_2$ gas, and 0 ppm for $NO_2$ gas. Thus, using granular magnesium produced much less NO and $H_2$ gas with nearly 4 times less NO in the same time frame when compared with the magnesium powder.

In the experiment with magnesium beads (about 5 mm diameter) and 1200 mg $KNO_3$ and 1000 mg citric acid powder, at 1 minute and 20 seconds into the experiment, no NO gas or $NO_2$ gas were produced. At 5 minutes after the addition of water, the sensor reading for NO gas was 16.2 ppm, for $NO_2$ gas was 0 ppm, and for hydrogen 337 ppm.

Our experiments show that coproduction of $H_2$ gas with NO gas with the disclosed methods and compositions reduces or even eliminates the production of $NO_2$ gas.

Example 16

It should also be noted that the inventors noticed that hydrogen, at high concentrations, can result in the formation of water that, if inhaled for prolonged times, would result in accumulation of water in a subject's lungs that could hinder oxygen absorption from the lungs. That would be an explanation for the low SpO2 the inventor suffered when he inhaled $H_2$ gas for a prolonged time to combat methemoglobinemia from NO. In a series of experiments comparing atmospheric humidity with $H_2$ concentration procured from the formulation at 30 C ambient temperature, the inventor noticed that for every about 40 ppm increase in $H_2$ concentration, the relative humidity would increase by 1% (the amount of water vapor present in air expressed as a percentage of the amount needed for saturation at the same temperature). The results of the relative humidity increase as the $H_2$ concentration increased are shown in Table 4 below.

TABLE 4

Impact of hydrogen gas on atmospheric humidity in a closed system.

| $H_2$ ppm | Atmospheric Humidity % |
| --- | --- |
| 0 | 44% |
| 178 | 47% |
| 322 | 48% |
| 458 | 49% |
| 526 | 50% |
| 587 | 51% |
| 617 | 52% |
| 647 | 53% |
| 676 | 54% |
| 720 | 56% |
| 754 | 57% |
| 779 | 58% |
| 801 | 59% |
| 826 | 60% |
| 858 | 61% |
| 897 | 62% |
| 1000 | 64% |

While the sensor's limit was reached at 1000 ppm, these experiments as well as the lack of any symptoms that there was water presence in the lungs (edema) in any of the subjects, show that 1000 ppm of $H_2$ concentrations are safe. It is assumed that up to 1500 ppm $H_2$ concentrations would also be safe with no noticeable $H_2O$ formation in the lungs for subjects inhaling the gases produced from the composition.

We claim:

1. A method of administering NO inhalation therapy, the method comprising:
   providing a vessel capable of housing liquid and gaseous constituents, wherein the vessel contains an acidic solution having a pH of 0.1-4;
   combining an effective amount of a nitrate salt and an effective amount of an elemental metal capable of being oxidized in the acidic solution in the vessel thereby producing NO gas and $H_2$ gas, wherein the gas constituents produced by combining the nitrate salt and the elemental metal in the acidic solution do not comprise unsafe levels of $NO_2$ gas for humans in the presence of oxygen; and
   administering the gas constituents produced to a human subject via the vessel capable of housing liquid and gas constituents.

2. The method of claim 1, wherein the elemental metal is selected from the group consisting of: elemental magnesium, elemental calcium, elemental lithium, elemental zinc, elemental potassium, elemental sodium, elemental beryllium, elemental barium, and elemental iron.

3. The method of claim 2, wherein the elemental metal is elemental magnesium.

4. The method of claim 2, wherein the elemental metal is elemental zinc.

5. The method of claim 1, wherein:
   the effective amount of elemental metal is between 1 mg and 2000 mg, and
   the effective amount of the nitrate salt provides between 30 mg and 4000 mg nitrate anion.

6. The method of claim 1, wherein the effective amount of the nitrate salt and the effective amount of the elemental metal are in a ratio from 10:1 to 1:10.

7. The method of claim 1, wherein the gas constituents produced comprise at least 5 ppm NO gas and at least 1000 ppm $H_2$ gas.

8. The method of claim 1, further comprising dissolving an acid powder in a solvent to produce the acidic solution, wherein the acid powder is selected from the group consisting of: citric acid, malic acid, and fumaric acid.

9. The method of claim 8, wherein the solvent is water.

10. The method of claim 9, wherein the acid powder is dissolved in between 1 ml and 10000 ml water.

11. The method of claim 1, wherein the levels of $NO_2$ gas produced by combining the nitrate salt and the elemental metal in the acidic solution do not exceed 2 ppm.

12. The method of claim 1, wherein the levels of $NO_2$ gas produced by combining the nitrate salt and the elemental metal in the acidic solution do not exceed 5 ppm.

13. The method of claim 1, wherein the levels of $NO_2$ gas produced by combining the nitrate salt and the elemental metal in the acidic solution do not exceed 10 ppm.

14. The method of claim 1, wherein the gas constituents produced by combining the nitrate salt and the elemental metal in the acidic solution do not comprise any $NO_2$ gas.

15. The method of claim 1, wherein the gas constituents produced by combining the nitrate salt and the elemental metal in the acidic solution further comprises nitroxyl gas.

16. The method of claim 1, wherein the vessel capable of housing liquid and gas constituents is a water pipe.

17. The method of claim 16, wherein administering the NO gas to the subject via the vessel capable of housing liquid and gas constituents comprises the subject inhaling from in the water pipe.

18. The method of claim 1, wherein the subject is suffering from difficulty breathing, suffering from migraine, has below 95 oxygen saturation levels, is a healthy subject seeking improved athletic performance, is a healthy subject seeking increased endurance, or is a healthy subject seeking improved mental performance.

19. The method of claim 1, wherein the vessel capable of housing liquid and gaseous constituents comprises:
   a top compartment, in which the acidic solution is contained;
   a middle compartment, in which the effective amount of the nitrate salt and the effective amount of the elemental metal are contained; and
   a bottom compartment,
   wherein:
      the top compartment and the middle compartment are in fluid connection with the bottom compartment, and
      the contents from the top compartment and the middle compartment are dropped in and combined in the bottom compartment, thereby producing thereby producing NO gas without unsafe levels of $NO_2$ gas for humans.

20. The method of claim 1, wherein the gas constituents produced by combining the nitrate salt and the elemental metal in the acidic solution are suitable for direct inhalation by humans without use of specialized ventilators that remove $NO_2$ or NO canisters that contain no oxygen.

21. The method of claim 1, further comprising inhaling the produced gas constituents directly from the vessel capable of housing liquid and gaseous constituents, thereby administering NO inhalation therapy.

22. The method of claim 7, wherein the gas constituents produced comprise between 5 ppm and 40 ppm NO gas and at least 1000 ppm $H_2$ gas.

23. The method of claim 1, wherein the nitrate salt is selected from sodium nitrate and potassium nitrate.

* * * * *